US011307850B2

(12) United States Patent
Murray

(10) Patent No.: US 11,307,850 B2
(45) Date of Patent: Apr. 19, 2022

(54) EFFICIENT CHANGE ANALYSIS IN POLY-LINGUAL CORPUS HIERARCHIES

(71) Applicant: Oracle International Corporation, Redwood Shores, CA (US)

(72) Inventor: Ryan D. Murray, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 15 days.

(21) Appl. No.: 17/028,670

(22) Filed: Sep. 22, 2020

(65) Prior Publication Data
US 2022/0091842 A1 Mar. 24, 2022

(51) Int. Cl.
| | |
|---|---|
| *G06F 11/20* | (2006.01) |
| *G06F 16/22* | (2019.01) |
| *G06F 16/30* | (2019.01) |
| *G06F 11/10* | (2006.01) |
| *G06F 8/71* | (2018.01) |

(Continued)

(52) U.S. Cl.
CPC ............ *G06F 8/71* (2013.01); *G06F 11/1004* (2013.01); *G06F 16/2272* (2019.01); *G06F 11/1448* (2013.01); *G06F 11/1451* (2013.01); *G06F 16/1844* (2019.01); *G06F 16/2255* (2019.01); *G06F 16/2365* (2019.01); *G06F 16/27* (2019.01); *G06F 16/285* (2019.01)

(58) Field of Classification Search
CPC .... G06F 8/71; G06F 16/2272; G06F 16/1844; G06F 16/2365; G06F 16/27; G06F 16/285; G06F 16/2255; G06F 11/1004; G06F 11/1451; G06F 11/1448
See application file for complete search history.

(56) References Cited

U.S. PATENT DOCUMENTS

| | | |
|---|---|---|
| 6,873,935 B2 | 3/2005 | Spinrad et al. |
| 6,880,149 B2 | 4/2005 | Cronce |

(Continued)

OTHER PUBLICATIONS

Tielei Wang et al., Checksum-Aware Fuzzing Combined with Dynamic Taint Analysis and Symbolic Execution, Sep. 2011, [ Retrieved on 2022-01-11], Retrieved from the internet: <URL: https://dl.acm.Org/doi/pdf/10.1145/2019599.2019600> 28 Pages (1-28) (Year: 2011).*

(Continued)

*Primary Examiner* — Anibal Rivera
(74) *Attorney, Agent, or Firm* — Kilpatrick Townsend & Stockton LLP

(57) ABSTRACT

Techniques to determine deltas of a target data structure against a source data structure. One technique includes obtaining directory level checksums and rolling checksums for a source set of code in a first data structure, obtaining directory level checksums and rolling checksums for a target set of code in a second data structure, comparing the directory level checksums and the rolling checksums obtained for the target set of code against the directory level checksums and the rolling checksums obtained for the source set of code, identifying a location of change data of the target set of code at directory level within the second data structure based on the comparison of the directory level checksums and the rolling checksums obtained for the target set of code against the directory level checksums and the rolling checksums obtained for the source set of code, and outputting the location of the change data.

17 Claims, 12 Drawing Sheets

(51) Int. Cl.
| | |
|---|---|
| G06F 16/23 | (2019.01) |
| G06F 16/28 | (2019.01) |
| G06F 11/14 | (2006.01) |
| G06F 16/27 | (2019.01) |
| G06F 16/182 | (2019.01) |

(56) References Cited

U.S. PATENT DOCUMENTS

| | | | |
|---|---|---|---|
| 8,826,222 | B2 | 9/2014 | Bak et al. |
| 8,838,559 | B1 | 9/2014 | O'Riordan |
| 8,938,670 | B2 | 1/2015 | Kolo |
| 9,898,460 | B2 | 2/2018 | Akbik et al. |
| 11,030,187 | B1* | 6/2021 | Boodman ............. G06F 16/285 |
| 2017/0147621 | A1* | 5/2017 | De Smet ............. G06F 16/2255 |
| 2019/0303237 | A1 | 10/2019 | Chauhan et al. |
| 2019/0306237 | A1 | 10/2019 | Srinivasan et al. |
| 2020/0117731 | A1* | 4/2020 | Deb .................... G06F 16/2365 |
| 2020/0394555 | A1 | 12/2020 | Chauhan |
| 2021/0303534 | A1* | 9/2021 | Solan ..................... G06F 16/27 |

OTHER PUBLICATIONS

Code Compare, Available Online at: https://www.devart.com/codecompare/text-compare-tool-structure-comparison.html, retrieved May 5, 2020, 1 page.
Code Compare is a Powerful Tool for File and Folder Comparison and Merging, Available Online at: https://marketplace.visualstudio.com/items?itemName=DevartSoftware.CodeCompare, retrieved May 5, 2020, 6 pages.
Code Reference Information, Available Online at: https://www.jetbrains.com/help/idea/viewing-reference-information.html, retrieved May 5, 2020, 1 page.
Compare Files, Folders and Text Sources, Available Online at: https://www.jetbrains.com/help/idea/comparing-files-and-folders.html, retrieved May 5, 2020, 2 pages.
Compare Local Changes with the Repository Version, Available Online at https://www.jetbrains.com/help/idea/viewing-changes-information.html, retrieved May 5, 2020, 5 pages.
IntelliJ IDEA, Available Online at: from, 2020, retrieved May 5, 2020, 1 page.
Source File Structure, Available Online at: https://www.jetbrains.com/help/idea/viewing-structure-of-a-source-file.html, retrieved May 5, 2020, 1 page.
Estes, An Introduction to Diffs and Patches, Available Online at: https://opensource.com/article/18/8/diffs-patches, Aug. 27, 2018, 7 pages.
Phoujdar, Verify the Integrity of Directory Trees Using Checksum Verifier, Available Online at: https://www.codeproject.com/Articles/26110/Verify-the-integrity-of-directory-trees-using-Chec, May 15, 2008, 4 pages.
5.7 Local Surrogate (LIME), Interpretable Machine Learning, Available Online at: https://christophm.github.io/interpretable-ml-book/lime.html, Accessed from Internet on Aug. 25, 2020, 10 pages.
Goerke, et al., 5.8 Scoped Rules (Anchors), Interpretable Machine Learning, Available Online at: https://christophm.github.io/interpretable-ml-book/anchors.html, Accessed from Internet on Aug. 25, 2020, 12 pages.
Ma; Edward, Anchor your Model Interpretation by Anchors, Towards Data Science, Available Online at: https://towardsdatascience.com/anchor-your-model-interpretation-by-anchors-aa4ed7104032, Sep. 9, 2018, 6 pages.
Ribeiro et al., "Why Should I Trust You?" Explaining the Predictions of Any Classifier, KDD '16: Proceedings of the 22nd ACM SIGKDD International Conference on Knowledge Discovery and Data Mining, Available Online at: https://dl.acm.org/doi/10.1145/2939672.2939778, Aug. 2016, pp. 1135-1144.
Ribeiro et al., Anchors: High-Precision Model-Agnostic Explanations, Association for the Advancement of Artificial Intelligence, Available Online at: https://homes.cs.washington.edu/~marcotcr/aaai18.pdf, 2018, 9 pages.
U.S. Appl. No. 16/939,534, First Action Interview Pilot Program Pre-Interview Communication dated Jan. 18, 2022, 5 pages.

* cited by examiner

EFFICIENT CHANGE ANALYSIS IN POLY-LINGUAL CORPUS HIERARCHIES

FIELD OF THE INVENTION

The present disclosure relates generally to code scanning, and more particularly, to techniques to determine deltas of a target data structure (e.g., a corpus hierarchy such as a tree) against a source data structure (e.g., a source tree).

BACKGROUND

Software Development Life Cycle (SDLC) is a process used by the software industry to design, develop and test high quality software. One of the primary tasks in SDLC is code review. Code review is a process that identifies bugs and vulnerabilities in code which may cause a problem in a later stage of the software development process and/or ultimately lead to defective or insecure software. In the SDLC, the code review process typically comes under the development phase, which means that when the software is being coded by the developers, they can perform self-code review, peer code review, specialist code review (e.g., a security analyst), or a combination thereof. The developers may use automated code review tools, which can be combined with their integrated development environment (IDE), for code review assistance, and in some instances allow for developers to perform coding and code review simultaneously. There are many different automated code review tools, also known as code scanners, available that can rapidly look at code to identify vulnerabilities, identify bugs, validate code against industry best practices, validate code against company-specific project specifications, or the like.

Generally automated code review tools can be classified into one of two groups based on the type of analysis being performed: dynamic analysis or static analysis. Dynamic analysis is performed on executable code of a compiled program and checks only user-specific behavior. That is, only the code (e.g., object code), executed during a test is checked. A dynamic analyzer can provide the developer with information on memory leaks, program's performance, call stack, etc. Static analysis allows checking program code (e.g., source code) before the tested program is executed. A compiler typically performs static analysis during the compilation process. However, in large, real-life projects it is often necessary to perform static analysis through-out development to ensure the source code fulfills additional requirements including reliability, maintainability, readability, testability, portability, and vulnerability. There are many different analysis techniques implemented by dynamic and static analyzers, such as abstract syntax tree (AST) walker analysis, dataflow analysis, path-sensitive data flow analysis, etc. Concrete implementations of these techniques vary from analyzer to analyzer. Dynamic and static analyzers for different programming languages can be based on various analysis frameworks. These frameworks contain core sets of common techniques, which can be used in dynamic and static analyzers so that these analyzers reuse the same infrastructure. The supported analysis techniques typically check for similarities or deltas (i.e., changes) to the code by comparing a revised version of the code to an older version or a baseline version of the code. However, the current techniques for identifying similarities and deltas within the code are slow and inefficient. Accordingly, quick and efficient techniques for identifying areas of change within the code is desired.

BRIEF SUMMARY

Techniques are provided (e.g., a method, a system, non-transitory computer-readable medium storing code or instructions executable by one or more processors) for determining deltas of one target data structure (e.g., a corpus hierarchy such as a tree) against a source data structure (e.g., a source tree).

In various embodiments, a method is provided that comprises: obtaining, by a data processing system, directory level checksums and rolling checksums for a source set of code in a first data structure; obtaining, by the data processing system, a target set of code in a second data structure; calculating, by the data processing system, directory level checksums for the target set of code; calculating, by the data processing system, rolling checksums for the target set of code based on the directory level checksums for the target set of code; comparing, by the data processing, the directory level checksums and the rolling checksums calculated for the target set of code against the directory level checksums and the rolling checksums calculated for the source set of code; identifying, by the data processing system, a location of change data of the target set of code at directory level within the second data structure based on the comparison of the directory level checksums and the rolling checksums calculated for the target set of code against the directory level checksums and the rolling checksums obtained for the source set of code; and outputting, by the data processing system, the location of the change data.

In some embodiments, the obtaining the directory level checksums and rolling checksums for the source set of code, comprises: creating directories for the first data structure; creating source files for the source set of code; populating the directories with the source files; calculating the directory level checksums for the source set of code; and calculating the rolling checksums for the source set of code based on the directory level checksums for the source set of code.

In some embodiments, the method further comprises: creating, by the data processing system, directories for the second data structure; creating, by the data processing system, target files for the target set of code; and populating, by the data processing system, the directories with the target files.

In some embodiments, the first data structure is a hierarchical data structure; the second data structure is the hierarchical data structure; the directory level checksums are calculated for each directory level node of the second data structure; upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

In some embodiments, the hierarchical data structure is in native format, and the comparing comprises a top down approach starting at root level comparison and working down each branch for the directory level checksum and the rolling checksum comparisons.

In some embodiments, the hierarchical data structure is in reverse format, and the comparing comprises a bottom up approach starting at root level comparison and working up each segment for the directory level checksum and the rolling checksum comparisons.

In some embodiments, the method further comprises obtaining, by the data processing system, file level checksums for the source set of code in the first data structure, and calculating, by the data processing system, file level checksums for the target set of code, where: the comparing comprises comparing the file level checksums, the directory level checksums, and the rolling checksums calculated for the target set of code against the file level checksums, the directory level checksums, and the rolling checksums calculated for the source set of code; the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and outputting, by the data processing system, the location of the change data.

In various embodiments, a non-transitory computer-readable memory is provided storing a plurality of instructions executable by one or more processors, the plurality of instructions comprising instructions that when executed by the one or more processors cause the one or more processors to perform processing comprising: obtaining directory level checksums and rolling checksums for a source set of code in a first data structure; obtaining a target set of code in a second data structure; calculating directory level checksums for the target set of code; calculating rolling checksums for the target set of code based on the directory level checksums for the target set of code; comparing the directory level checksums and the rolling checksums calculated for the target set of code against the directory level checksums and the rolling checksums calculated for the source set of code; identifying a location of change data of the target set of code at directory level within the second data structure based on the comparison of the directory level checksums and the rolling checksums calculated for the target set of code against the directory level checksums and the rolling checksums obtained for the source set of code; and outputting the location of the change data.

In some embodiments, the obtaining the directory level checksums and rolling checksums for the source set of code, comprises: creating directories for the first data structure; creating source files for the source set of code; populating the directories with the source files; calculating the directory level checksums for the source set of code; and calculating the rolling checksums for the source set of code based on the directory level checksums for the source set of code.

In some embodiments, the processing further comprises: creating, by the data processing system, directories for the second data structure; creating, by the data processing system, target files for the target set of code; and populating, by the data processing system, the directories with the target files.

In some embodiments, the first data structure is a hierarchical data structure; the second data structure is the hierarchical data structure; the directory level checksums are calculated for each directory level node of the second data structure; upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

In some embodiments, the hierarchical data structure is in native format, and the comparing comprises a top down approach starting at root level comparison and working down each branch for the directory level checksum and the rolling checksum comparisons.

In some embodiments, the hierarchical data structure is in reverse format, and the comparing comprises a bottom up approach starting at root level comparison and working up each segment for the directory level checksum and the rolling checksum comparisons.

In some embodiments, the processing further comprises: the comparing comprises comparing the file level checksums, the directory level checksums, and the rolling checksums calculated for the target set of code against the file level checksums, the directory level checksums, and the rolling checksums calculated for the source set of code; the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and outputting, by the data processing system, the location of the change data.

In various embodiments, a system is provided comprising: one or more processors; and a memory coupled to the one or more processors, the memory storing a plurality of instructions executable by the one or more processors, the plurality of instructions comprising instructions that when executed by the one or more processors cause the one or more processors to perform processing comprising: obtaining directory level checksums and rolling checksums for a source set of code in a first data structure; obtaining a target set of code in a second data structure; calculating directory level checksums for the target set of code; calculating rolling checksums for the target set of code based on the directory level checksums for the target set of code; comparing the directory level checksums and the rolling checksums calculated for the target set of code against the directory level checksums and the rolling checksums obtained for the source set of code; identifying a location of change data of the target set of code at directory level within the second data structure based on the comparison of the directory level checksums and the rolling checksums calculated for the target set of code against the directory level checksums and the rolling checksums calculated for the source set of code; and outputting the location of the change data.

In some embodiments, the obtaining the directory level checksums and rolling checksums for the source set of code, comprises: creating directories for the first data structure; creating source files for the source set of code; populating the directories with the source files; calculating the directory level checksums for the source set of code; and calculating the rolling checksums for the source set of code based on the directory level checksums for the source set of code.

In some embodiments, the first data structure is a hierarchical data structure; the second data structure is the hierarchical data structure; the directory level checksums are calculated for each directory level node of the second data structure; upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

In some embodiments, the hierarchical data structure is in native format, and the comparing comprises a top down approach starting at root level comparison and working down each branch for the directory level checksum and the rolling checksum comparisons.

In some embodiments, the hierarchical data structure is in reverse format, and the comparing comprises a bottom up approach starting at root level comparison and working up each segment for the directory level checksum and the rolling checksum comparisons.

In some embodiments, the processing further comprises: the comparing comprises comparing the file level checksums, the directory level checksums, and the rolling checksums calculated for the target set of code against the file level checksums, the directory level checksums, and the rolling checksums calculated for the source set of code; the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and outputting, by the data processing system, the location of the change data.

DETAILED DESCRIPTION

Figure 1:
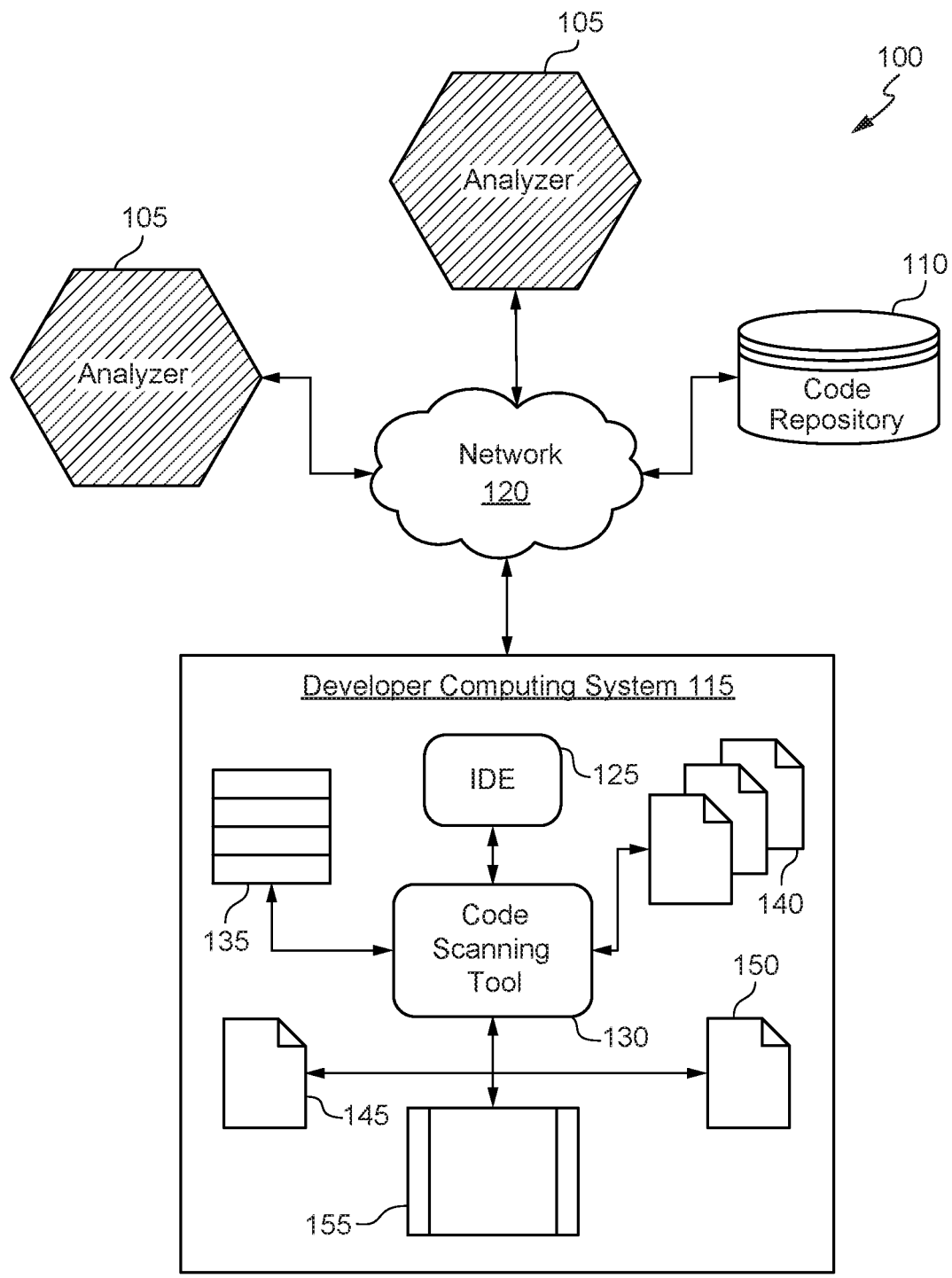
FIG. 1 depicts a block diagram illustrating computing system for scanning and analyzing code in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Introduction

In various embodiments, a code scanning tool is provided that can be used to determine similarities and deltas of one target data structure (e.g., a corpus hierarchy such as a tree) against a source data structure (e.g., a source tree). The code scanning tool may be implemented as a standalone piece of software, hardware, or combination thereof, or implemented in a variety of applications including code editors, web browsers, software design tools, code analyzers, etc. In some embodiments, the code scanning tool is implemented as part of a toolbar or menu, and when invoked by a user, helps the user determine similarities and deltas of one target data structure against a source data structure. As used herein, a "data structure" refers to a specialized means of organizing and storing data in computers in such a way that users can perform operations on the stored data more efficiently. There are various types of data structures including linear data structures, tree data structures, hash-based data structures, graph data structures, and others. As used herein, a "tree data structure", a "hierarchical data structure" or simply a "tree" refers to is a widely used abstract data type (ADT) that simulates a hierarchical tree structure, with a root value and subtrees of children with a parent node, represented as a set of linked nodes. A tree may be defined recursively as a collection of nodes (starting at a root node), where each node is a separate data structure comprised of one or more values or objects, together with a list of references to nodes (the "children"), with the constraints that no reference is duplicated, and no reference points to the root. Alternatively, the tree may be defined abstractly as a whole (globally) as an ordered tree, with one or more values or objects assigned to each node.

Many processes and applications used in SDLC require methods to quickly match similarities or deltas (i.e., changes). From a security perspective, an applied example is comparing the changes that have occurred to an image that differ from the approved security baseline. By efficiently matching and only processing the areas of change, security scanners can perform at a high velocity, and therefore scan more deeply. The current standards for identifying similarities or changes in large corpus hierarchies (shorthanded to 'tree' hence forward), are to use a Merkel Tree rolling checksum to compare identical trees, or a node by node comparison of underlying code or data for matches. The Merkel Tree rolling checksum will only match if the entire trees match exactly. While this is critical for securing transactions, if the goal is to capture and process deltas in the tree's then this method does not work appropriately. The trees are known/assumed to be different, and likely will never fully match. The other standard methods require checking each file under each node, and creating a map of all the files/areas of change in the evaluated tree. This process is time consuming and is unable to take advantage of the rolling checksum benefits afforded with a Merkel Tree. Given the scale of thousands of evaluations of very large size sized trees (e.g., greater than 1 GB), the need for a quick evaluation is present.

To overcome the challenges of determining similarities and deltas, various embodiments are directed to a code scanning tool that can be used to automatically determine similarities and deltas of one target data structure against a source data structure based on a rolling checksum. As used herein, when an action is "based on" something, this means the action is based at least in part on at least a part of the something. In various embodiments, a technique implemented by the code scanning tool includes: obtaining, by a data processing system, directory level checksums and rolling checksums for a source set of code in a first data structure; obtaining, by the data processing system, a target set of code in a second data structure; calculating, by the data processing system, directory level checksums for the target set of code; calculating, by the data processing system, rolling checksums for the target set of code based on the directory level checksums for the target set of code; comparing, by the data processing, the directory level checksums and the rolling checksums calculated for the target set of code against the directory level checksums and the rolling checksums calculated for the source set of code; identifying, by the data processing system, a location of change data of the target set of code at directory level within the second data structure based on the comparison of the directory level checksums and the rolling checksums calculated for the target set of code against the directory level checksums and the rolling checksums calculated for the source set of code; and outputting, by the data processing system, the location of the change data.

Code Scanning Environment

FIG. 1 is a block diagram illustrating a computing system 100 for scanning and analyzing code in accordance with various embodiments. As shown in FIG. 1, one or more analyzers 105 (e.g., code scanners), code repository 110, and developer computing system 115 communicate with each other across network 120. Computing system 100 may be computerized such that each of the illustrated components comprises a computing device that is configured to communicate with other computing devices via network 120. For example, developer computing system 115 may include one or more computing devices, such as a desktop, notebook, or handheld computing device that is configured to transmit and receive data to/from other computing devices via network 120. Similarly, the analyzers 105 and code repository 110 may include one or more computing devices that are configured to communicate data via the network 120. In some embodiments, these computing systems may be implemented using one or more computing devices dedicated to performing the respective operations of the systems as described herein.

The analyzers 105 can be a computing system that analyzes code (e.g., source code) to identify vulnerabilities, identify bugs, validate code against industry best practices, validate code against company-specific project specifications, or the like (e.g., for detecting defects in a software project's source code). Each of the analyzers 105 can contain multiple modules and/or components for performing its operations. In some embodiments, each analyzer 105 includes a data collector and an analysis engine. The data collector is configured to obtain or receive code for analysis. In some instances, the data collector is configured to obtain or receive code from the code repository 110. The analysis engine is configured to analyze the obtained or received code using one or more analysis techniques and output metrics consistent with the one or more analysis techniques. The modules and/or components process the code including creating needed directories and files, creating source and target files and/or populating directories with source and target files, calculating checksums for directory and optionally file level code or data, and calculating rolling checksums for directory and tree level code or data.

In some instances, the analysis engine is configured to split the code into tokens, i.e., constants, identifiers, reserved symbols, etc. This operation may be performed by a lexer component of the analysis engine responsible for dividing the input code into individual tokens, identifying the type of the tokens, and passing tokens one at a time to the next stage of the analysis. Thereafter, the tokens are passed to a parser component of the analysis engine, which builds an AST based on the tokens. The lexer may process the code using syntax of the programming language used to write the code and the parser has an understanding of the programming language's grammar to recognize context of the code. Once the code is processed, the analysis engine is configured to analyze the code over the AST using one or more different analysis techniques, such as pattern matching, AST walker analysis, dataflow analysis, path-sensitive data flow analysis, or the like. The modules and/or components of the analyzer 105 may communicate data between each other according to known data communication techniques and, in some embodiments, can communicate with external computing systems such as code repository 110 and developer computing system 115.

The code repository 110 may be one or more computing systems that store, maintain, and track modifications to one or more code bases (e.g., sets of code). In certain instances, the code repository 110 may also store checksums and rolling checksums calculate for one or more code bases. Generally, code repository 110 may be one or more data storage devices such as a server computing system configured to accept requests for versions of a code project and accept changes as provided by external computing systems, such as developer computer system 115. For example, code repository 110 may include a web server and code repository 110 can provide one or more web interfaces allowing external computing systems, such as analyzer 105 and developer computer system 115 to access and modify code stored by code repository 110. Code repository 110 can also expose an application programming interface (API) that can be used by external computing systems to access and modify the stored code. Further, while the embodiment illustrated in FIG. 1 shows code repository 130 in singular form, in some embodiments, more than one code repository having features similar to code repository 110 can be connected to network 120 and communicate with the computer systems described in FIG. 1, consistent with disclosed embodiments.

The developer computer system 115 may be a computer system used by a user such as a software developer or security analyst for writing, reading, modifying, or otherwise accessing code (e.g., a security analyst accessing to analyze code for security vulnerabilities) stored in code repository 110. While the developer computer system 115 is typically a personal computer, such as one operating a UNIX, Windows, or Mac OS based operating system, developer computer system 115 can be any computing system configured for writing, reading, modifying, or otherwise accessing code. Generally, developer computer system 115 includes one or more developer tools and applications for software development. These tools may include, for example, an IDE 125 and a code scanning tool 130. One illustrative example of a code scanning tool is a code comprehension tool, as described in detail herein. An IDE 125 is typically a software application providing comprehensive facilities to software developers for developing software and normally comprises a source code editor, build automation tools, and a debugger. Some IDEs allow for customization by third parties, which can include add-on or plug-in tools that provide additional functionality to developers. The code scanning tool 130 is software, hardware, or a combination thereof providing capabilities to users such as software developers or security analysts for determining a programming language of a set of code based on learned programming language patterns, as described in detail herein. In some instances, IDEs 125 executing on developer computer system 115 can include plug-ins for communicating with the analyzer 110, code repository 115, and/or code scanning tool 130. Further, while the embodiment illustrated in FIG. 1 shows code scanning tool 130 as residing within the developer computer system 115, in some embodiments, the code scanning tool 130 can reside in a different computing system such as the analyzer 105 (or a computing system entirely remote from system 100) and may be connected to network 120 and communicate with the computer systems described in FIG. 1, consistent with disclosed embodiments.

In some embodiments, developer computer system 115 stores and executes instructions that perform one or more operations associated with the analyzer 110, code repository 115, and/or code scanning tool 130. In some instances, the developer computer system 115 is configured to control the analyzer 110, code repository 115, and/or code scanning tool 130 to perform one or more offline and/or online processes. Offline and/or online processes associated with training modules or using trained modules of the code scanning tool 130 to process the code may include creating needed directories and files, creating source and target files and/or populating directories with source and target files, calculating checksums for directory and optionally file level code or data, calculating rolling checksums for directory and tree level code or data, and comparing checksums between reference (source) and target code or data to identify similarities and or deltas in the underlying code or data.

Network 120 may be any type of network familiar to those skilled in the art that can support data communications using any of a variety of commercially-available protocols, including without limitation TCP/IP, SNA, IPX AppleTalk, and the like. Merely by way of example, network 120 can be a local area network (LAN) such as an Ethernet network, a Token-Ring network and/or the like, a wide-area network (WAN), a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks. Any other combination of networks, including secured and unsecured network communications are contemplated for use in the systems described herein. Although exemplary computing system 100 is shown with two analyzers and one developer computing system, any number of analyzers and/or developer computing devices may be supported, in other embodiments.

Change Analysis Techniques in Poly-Lingual Corpus Hierarchies
Illustrative Example A code comprehension tool is described herein to make it easier to understand and explore existing code bases by providing cross-references (e.g., an efficient way to determine which parts of a large directory structure (trees) of a code repository are the same and which parts of the directory structure (trees) are not the same and have changed over time). Most tools for comprehending code repositories—for syntax highlighting, bug detection, vulnerability scanning—are cooperative: the code authors use such tools to assist in their ongoing development cycle. For the present disclosure, a code comprehension tool is described that takes into consideration "non-cooperative" efforts or attempts to intentionally introduce vulnerabilities or inconsistencies into the code. The tool utilizes language detection and comprehension techniques to scan an arbitrary poly-lingual code base for vulnerabilities (language detection even in the presence of evasive efforts, including comprehending multiple language use within a single source file) using various tree, directory, and file level checksums.

In one illustrative example, a reference tree is obtained (e.g., the past code with known checksums already calculated for tree, directory, and file levels) and a target tree is obtained (e.g., a tree submitted by a service that may have potential changes to the code and does not have checksum previously calculated). The code comprehension tool calculates checksums (cs) for the target tree (a rolling checksum for the entire tree or branches and a relative checksum for the directory level) and compares the checksums between the target tree and the reference tree to find similarities and differences in the code or data, where a difference is indicative of a change in the code. As used herein, a "checksum" is a value used to verify the integrity of a file or a data transfer. In other words, it is a sum that checks the validity of data (e.g., confirms similarity or delta between data). In some instances, the checksum is calculated by applying a hash function or algorithm (e.g., SHA256 cryptographic hash) to the underlying data (e.g., the hash function or algorithm may be applied to the binary value of underlying data). The code comprehension tool calculates the checksums for the reference tree using the hash function or algorithm, calculates the checksums for the target tree using the same hash function or algorithm, and compares results across the reference and target trees. Any difference between checksums is determinative of a delta in the underlying code or data.

Figures 2A, 2B:
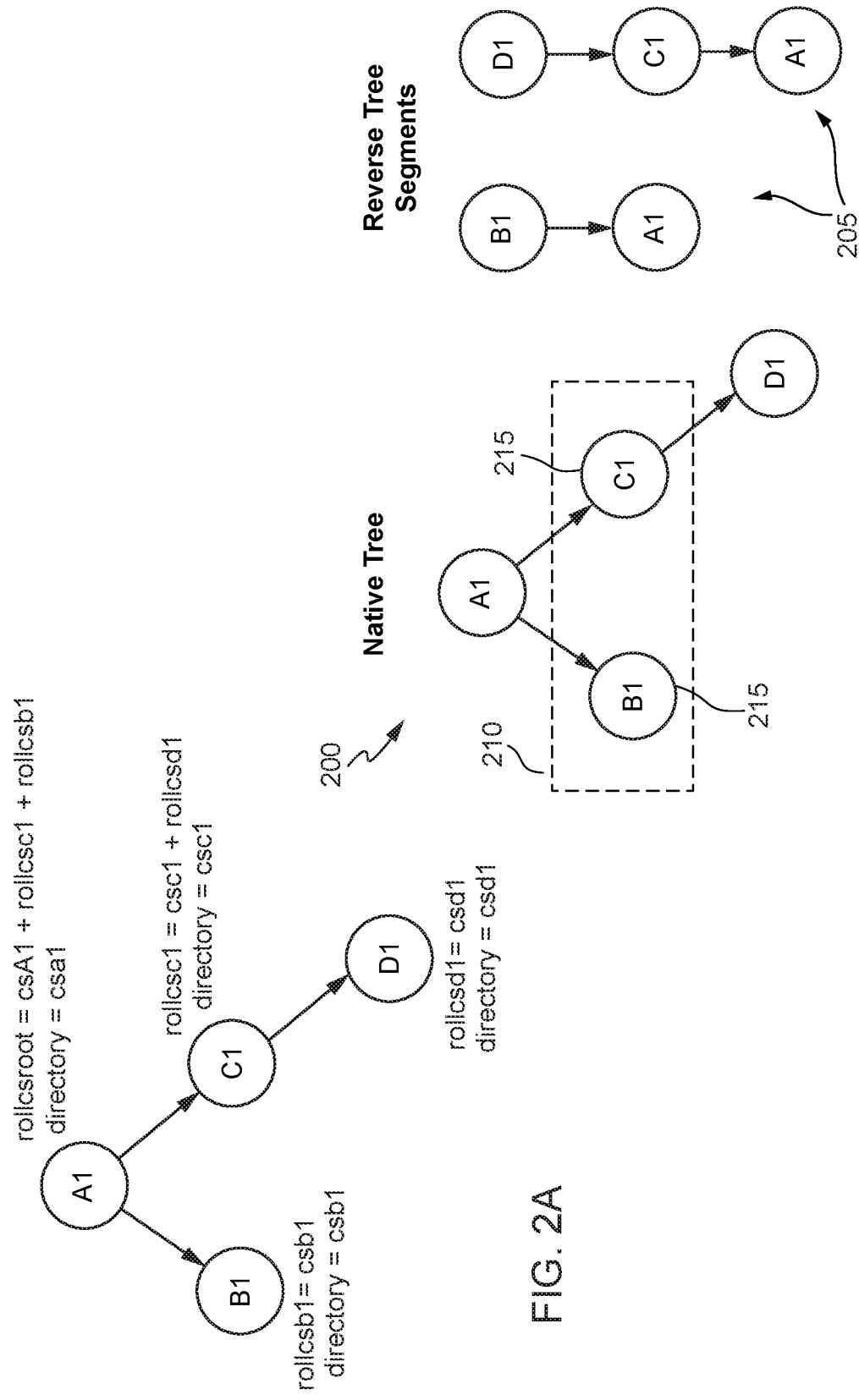
FIGS. 2A and 2B depict data structures illustrating techniques to determine deltas of a target data structure against a source data structure in accordance with various embodiments.

With reference to FIG. 2A, the code comprehension tool calculates a directory level checksum (cs) for directory d1 is csd1, since this is the first directory or leaf of the branch, then the rolling checksum rollcsd1 is calculated, also=csd1. Next, the code comprehension tool calculates the directory level checksum csc1, and the rolling checksum rollcsc1, which is a concatenation of =rolling checksum from directory d1 (rollcsd1) and rolling checksum from directory c1 (rollcsc1), the directory level checksum and rolling checksum for the directory level are saved (this is different from a traditional Merkle Tree, which only keeps a rolling checksum calculation and does not save it for each level of tree), and the technique continues until each directory level is calculated and the root level is reached from each branch/leaf. The search/comparison between the reference tree and target tree can start with the rolling checksum for the root (rollcsroot), which in this instance is a concatenation between the root directory checksum (csa1), the B1 rolling checksum (rollcsb1 of the first branch) and C1 the (rollcsc1 of the second branch), and if the rollcsroot is the same between the reference tree and update tree then no further action is need as the code in the trees is the same. However, if they are different (this is different from a traditional Merkle Tree), then the process compares rolling checksums saved at each directory level till a branch is found with different rolling checksums (e.g., rollcsb1 and rollcsc1) and if the checksum for one or more of the branches are different then the code comprehension tool also checks directory level checksums (e.g., csb1 and csc1) at each directory level until it finds code or data that have changes. Once the directory level changes are discovered, individual code comparison can be performed to identify the exact change that has occurred between the reference tree and the target tree.

Reversing Trees

As used herein, a "node" is a structure which may contain a value or condition, or represent a separate data structure (which could be a tree of its own). Each node in a tree has zero or more child nodes, which are below it in the tree. By convention, trees are drawn growing downwards and thus the bottom of the tree would be identified by external or leaf nodes (any node that does not have child nodes). Thus, in a top down approach for a conventional tree, each node checksum should be checked all the way down the tree (from the root to the leaf nodes) in order to find the deltas. However, if it is assumed that most deltas occur towards the bottom of the tree, then checking each nodes rolling checksum from top to bottom may be an inefficient process (especially in trees that have hundreds to thousands of nodes). In contrast, if the tree is reversed (from leaf nodes to the root), the nodes with deltas could be discovered earlier with a rolling checksum match. As shown in FIG. 2B, when a tree 200 is reversed, multiple segments 205 are possible. Any sub level 210 where more than one child node 215 is present, will result in multiple segments 205 when reversed. After creating reverse tree segments 205, the segments 205 may be sorted by segment length (length from leaf to root) and comparisons for identical and delta determinations run on the longest segment first. These are the deepest paths suspected of change, so checking them first may be advantageous.

Calculating Rolling Checksums

Figure 3A:
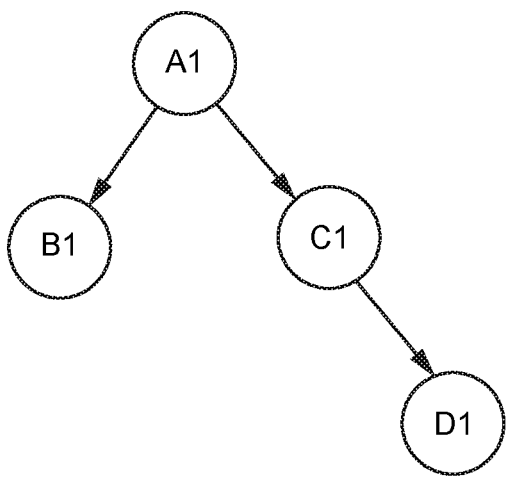
FIGS. 3A-3H depict data structures illustrating techniques to determine deltas of a target data structure against a source data structure in accordance with various embodiments.

To calculate rolling checksums, directory or node level checksums are used. These node level checksums can generate both the top down rolling checksum for native tree comparisons, and the bottom up rolling checksum for reverse tree comparisons. For example, as shown in FIG. 3A, the root node A1 top down (e.g., A1→C1→D1) rolling checksum is calculated as the [A1 directory cs]+[B1 top down rolling cs (=B1 directory cs)]+[C1 top down rolling cs (=C1 directory cs+D1 top down rolling cs)]. The leaf node D1 bottom up (e.g., D1→C1→A1) rolling checksum is calculated as [D1 directory cs]+[C1 bottom up rolling cs (=C1 directory cs+A1 bottom up rolling cs]. The branch node C1 top down rolling checksum is calculated as [C1 directory cs]+[D1 top down rolling cs (=D1 directory cs)]. The branch node C1 bottom up rolling checksum is calculated as [C1 directory cs]+[A1 bottom up rolling cs (=A1 directory cs)]. If there are no child nodes under a node, then the rolling CS is set to the node's CS, as it is the bottom of the rolling path, e.g., D1 top down rolling cs (=D1 directory cs) and A1 bottom up rolling cs (=A1 directory cs).

Comparisons

In various embodiments, once the directory or node level checksums and the rolling checksums are calculated for the target tree, the target tree checksums are compared to the reference tree checksums. With reference back to FIG. 3A for native tree comparisons, the order of comparison may be as follows: start with comparing the root rolling checksum (1) A1 top down rolling cs, then compare the root directory checksum (2) A1 directory cs, then select a branch to follow and alternate, for each directory, between comparing each directory's rolling checksum and the directory checksum (3) B1 top down rolling cs, (4) B1 directory cs, once a leaf node is reached for a selected branch, select another branch to follow and alternate, for each directory, between comparing each directory's rolling checksum and the directory checksum (5) C1 top down rolling cs, (6) C1 directory cs, (7) D1 top down rolling cs, and (8) D1 directory cs, and continue this process iteratively until all branches have been selected and compared.

Figure 3B:
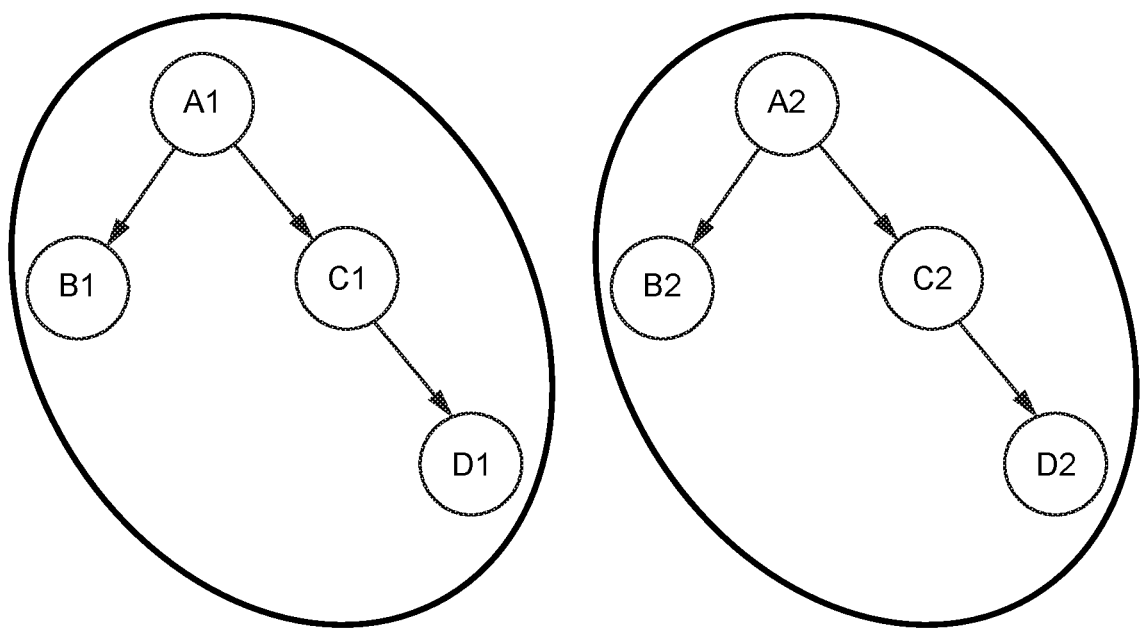
Figure 3C:
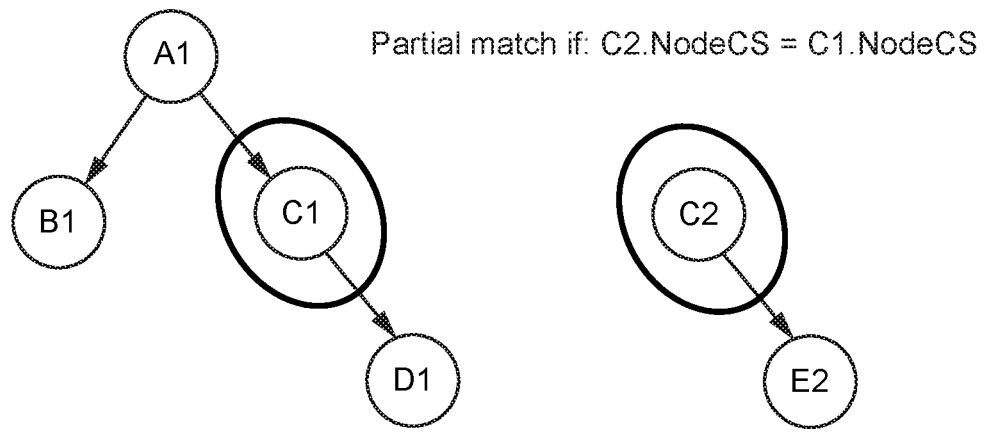

As shown in FIG. 3B, if the root (top level) rolling checksums between the reference and target trees are identical (match) then the data within the entire trees are identical. No other evaluations are needed if this match is found and the comparison process can end. If not (the root rolling checksums between the reference and target trees are different) then the process continues down each branch as described. As shown in FIG. 3C, if the top down rolling checksums are different for a given directory but the directory checksums are identical then it can be assumed the delta does not exist at that level of the tree. A shown in FIG. 3D, if the top down rolling checksums are different for a given directory and the directory checksums are different then it can be assumed a delta does exist at that level of the tree (i.e., mismatches between directory checksums will identify deltas in the underlying data within that directory between the reference and target trees). However, even once a delta is identified at the directory checksum, it should not be assumed that is the only delta within the tree/branch. The process should continue looking for deltas and once a top down rolling checksum is found to be identical, it can be assumed the rest of the data within the branch down to the leaf is identical, as shown in FIG. 3E. No other evaluations are needed within the branch if this match is found, and the comparison process may continue with any remaining branches or end if no remaining branches exist.

For reverse tree comparisons, the order of comparison may be as follows: start with comparing the root rolling checksum (1) A1 top down rolling cs prior to reversing the tree just to ensure that the update and reference trees are not identical (as described with respect to FIG. 3B), and then compare the root directory checksum (2) A1 directory cs, as the root directory checksum feeds into the reverse searches. As shown in FIG. 3F, the end of each reverse segment is the root directory A1 so it is possible to compare the root directory A1 only once against the reference tree. After comparing the A1 directory cs, the result is stored in memory and the A1 directory cs may be trimmed from all reverse tree branches or segments by shorting the length of each list. The segments are then sorted by length, and may be searched in order of longest to shortest. For example, start with comparing the leaf rolling checksum (3) J1 bottom up rolling cs, then compare the leaf directory checksum (2) J1 directory cs, then alternate, for each directory, between comparing each directory's rolling checksum and the directory checksum (4) I1 bottom up rolling cs, (5) I1 directory cs, (6) G1 bottom up rolling cs, (7) G1 directory cs, (8) H1 bottom up rolling cs, (9) H1 directory cs, (10) C1 bottom up rolling cs, (11) C1 directory cs, once an end of the segment is reached, select the next longest segment to follow check the leaf and then alternate, for each directory, between comparing each directory's rolling checksum and the directory checksum (12) B1 bottom up rolling cs, (13) B1 directory cs, and continue this process iteratively until all segments have been selected and compared.

Figure 3D:
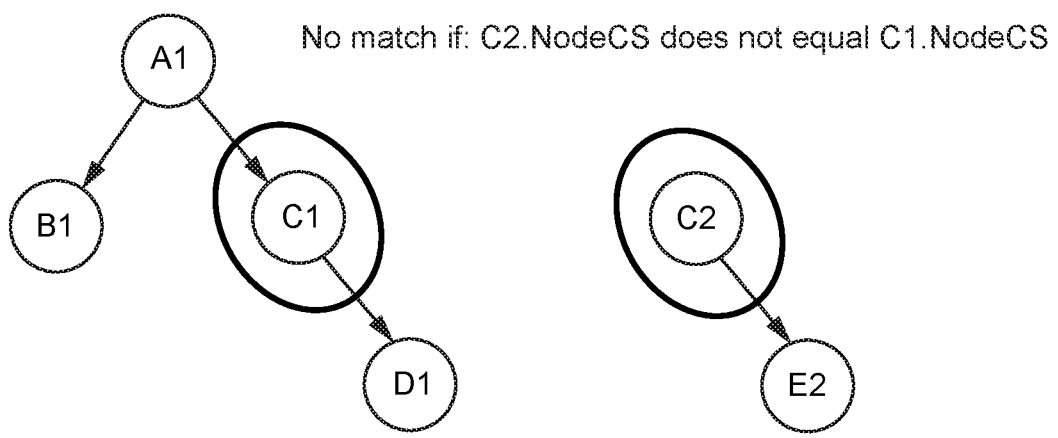
Figure 3E:
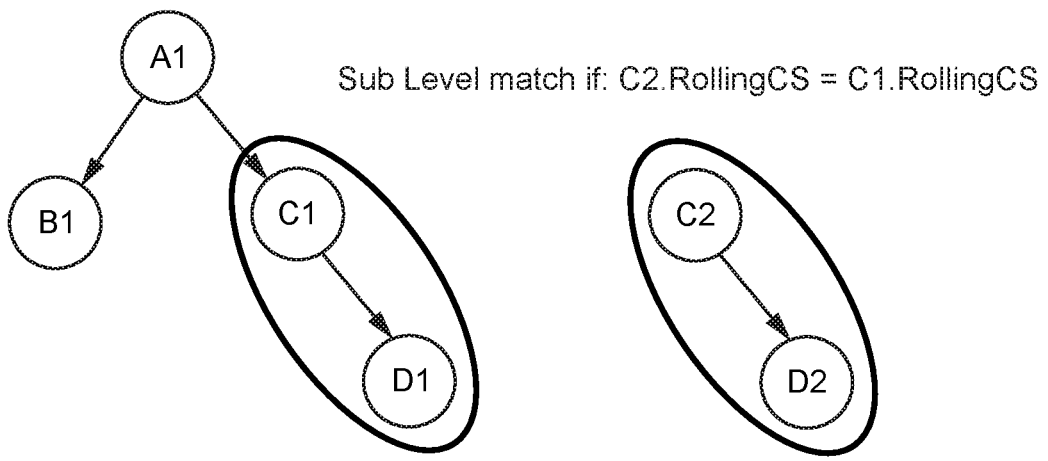
Figure 3F:
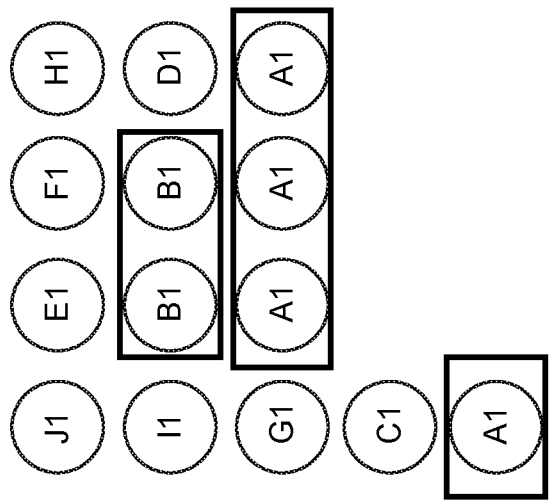
Figure 3F:
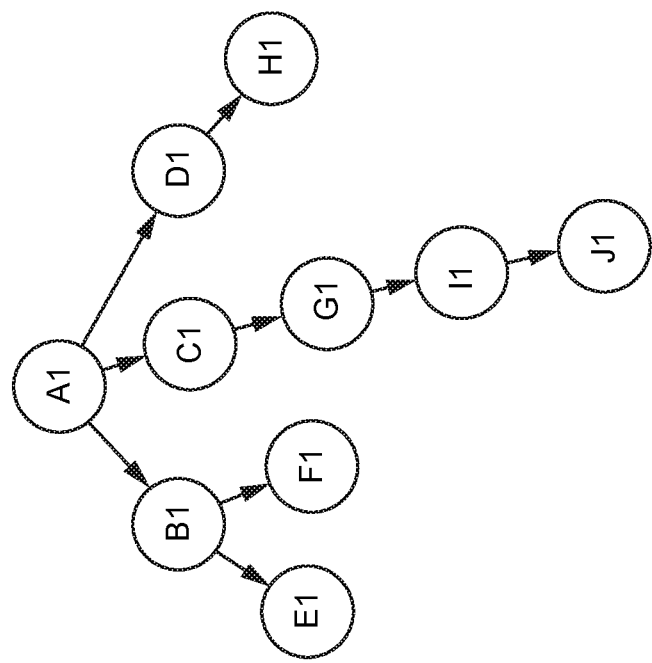

As described with respect to the native tree and FIGS. 3C-3E, if the bottom up rolling checksums are different for a given directory but the directory checksums are identical then it can be assumed the delta does not exist at that level of the tree. If the bottom up rolling checksums are different for a given directory and the directory checksums are different then it can be assumed a delta does exist at that level of the tree (i.e., mismatches between directory checksums will identify deltas in the underlying data within that directory between the reference and target trees). However, even once a delta is identified at the directory checksum, it should not be assumed that is the only delta within the tree/segment. The process should continue looking for deltas and once a bottom up rolling checksum is found to be identical, it can be assumed the rest of the data within the segment up to the root is identical, and the comparison process may continue with any remaining segment or end if no remaining segments exist.

An example showing the benefit of the reverse tree comparison is clear if it is assumed J1 is the only location of deltas. A native tree search, even using rolling checksums, would require 5 node comparisons to identify the delta (working all the way down the branch). Reversing the tree, leaves J1 as the first node to compare, which captures the delta when the J1/J2 directory checksums are different. Thereafter, the I1/I2 rolling checksums will match, and G1 and C1 will not require comparisons. Another level of search improvement of the reverse tree comparison is that addition to the elimination of duplication checks of the Root folder (A1), any duplicate nodes from different reverse tree segments can be checked only once (e.g., as shown in FIG. 3F—B1 from the E1 segment matches B1 from the F1 segment), which eliminates duplicate work. This duplication removal is a property of reversing the nodes, not based on content or checksum evaluations. If duplicates are not removed prior to or during content evaluation, the reversal search creation/searching may be less efficient due to duplicate work and input/output.

The duplicate node removal can be accomplished by storing node checksums in a hash table for quick lookups, avoiding file input/output and compute processing and time. Alternatively and more efficiently, the list of reverse tree segments can be compared against each other, therefore avoiding the duplication check all together. For example, referencing FIG. 3F and after the already mentioned A1 duplicated tree is trimmed from the reverse tree segments, a segment comparison shows B1 to be used in two segments. The shorter of the lists (or the second list check in case of identically sized segments) the F1→B1 segment, is trimmed to just F1. The E1→B1 segment remains. This process can be repeated for any duplicate nodes before calculating the checksums and rolling checksums for the reverse segments. It should be noted, the evaluation for duplicate nodes between reverse segment nodes is not based on checksums, it is a property of reversing a tree. The contents of the nodes need not be evaluated for removal of duplicates, only a name associated to the node for string based duplication comparisons. This property makes eliminating duplicate nodes very efficient from a reverse tree segment list, keeping the reversal creation and comparison with another target tree without large compute penalties for the reversal.

Examples

Initially, directories for the target and reference (source) trees are created. In this instance, directories for one reference tree and two test tress (target trees) with a similar structure as shown in FIG. 3A are created as follows:

```
mkdir -p {source, test1, test2}/A/{B, C}
mkdir -p {source, test1, test2}/A/C/D
```

Source files/data are then created or populated for each directory such that valid checksums for the reference files/data can be calculated. The source files/data may be created as follows:

```
echo "source a1" > source/A/a1
echo "source b1" > source/A/B/b1
echo "source c1" > source/A/C/c1
echo "source d1" > source/A/C/D/d1
```

The checksums for each source files/data are calculated by applying a hash function or algorithm to the source files/data. In this instance, the MD5 message-digest algorithm is applied to the to the source files/data producing a 128-bit hash value as follows:

```
MD5 (A/a1)    = c79c33cd9789303c823cf5c74e45cafd
MD5 (A/C/c1)  = 08d389c6afe9a646bbcac6379614dd2f
MD5 (A/C/D/d1)= fa30fe8f82549bf817911f7166d1ab18
MD5 (A/B/b1)  = 91cf7e2ce804288734d624df4d8b80bc
```

The rolling checksums for each directory level are calculated as a concatenation of prior directory checksums or rolling checksums as follows:

| | |
|---|---|
| A1 Node CS | c79c33cd9789303c823cf5c74e45cafd |
| A1 top down (TD) Rolling CS | ae1ba570272c5dd8748681b22fc5be1a = CS of: |
| | 7b31b32fec24b4cf908259dffa6d6ac4 |
| | 91cf7e2ce804288734d624df4d8b80bc |
| | c79c33cd9789303c823cf5c74e45cafd |
| A1 bottom up (BU) Rolling CS | c79c33cd9789303c823cf5c74e45cafd |
| B1 Node CS | 91cf7e2ce804288734d624df4d8b80bc |
| B1 TD Rolling CS | 91cf7e2ce804288734d624df4d8b80bc |
| B1 BU Rolling CS | d9f95ae63571913168f5a3eed8dba6de = CS of: |
| | 91cf7e2ce804288734d624df4d8b80bc |
| | c79c33cd9789303c823cf5c74e45cafd |
| C1 Node CS | 08d389c6afe9a646bbcac6379614dd2f |
| C1 TD Rolling CS | 7b31b32fec24b4cf908259dffa6d6ac4 = CS of: |
| | 08d389c6afe9a646bbcac6379614dd2f |
| | fa30fe8f82549bf817911f7166d1ab18 |
| C1 BU Rolling CS | 1e8fe243729dd26f02f5e65a6ab307ef = CS of: |
| | 08d389c6afe9a646bbcac6379614dd2f |
| | c79c33cd9789303c823cf5c74e45cafd |
| D1 Node CS | fa30fe8f82549bf817911f7166d1ab18 |
| D1 TD Rolling CS | fa30fe8f82549bf817911f7166d1ab18 |
| D1 BU Rolling CS | 526ed46f9512345957e6fd9b8417f4aa = CS of: |
| | 1e8fe243729dd26f02f5e65a6ab307ef |
| | fa30fe8f82549bf817911f7166d1ab18 |

Figure 3G:
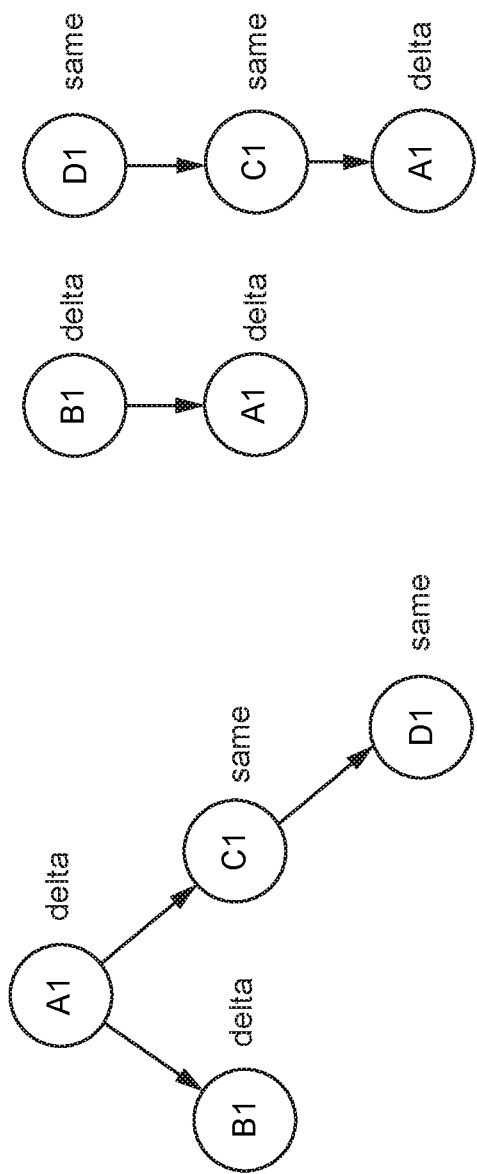

FIG. 3G shows an target tree—Test 1 tree to evaluate against the reference tree. For illustrative purposes the directories or nodes are marked as to whether they contain identical or different data. The directories or nodes are shown in both a native tree format and reverse tree segments. Test 1 files/data are then created or populated for each directory such that valid checksums for the reference files/data can be calculated. The source files/data may be created as follows:

```
echo "test1 a1" > test1/A/a1
echo "test1 b1" > test1/A/B/b1
echo "test1 c1" > test1/A/C/c1
echo "test1 d1" > test1/A/C/D/d1
```

The checksums for each Test 1 files/data are calculated by applying a hash function or algorithm to the source files/data. In this instance, the MD5 message-digest algorithm is applied to the to the source files/data producing a 128-bit hash value as follows:

| | |
|---|---|
| MD5 (A/a1) = | 967ede40cfdbddff746969316416f75a |
| MD5 (A/C/c1) = | 08d389c6afe9a646bbcac6379614dd2f. |
| MD5 (A/C/D/d1) = | fa30fe8f82549bf817911f7166d1ab18. |
| MD5 (A/B/b1) = | a7e3fff9d32c29f8938f81b53194f18d |

The rolling checksums for each directory level are calculated as a concatenation of prior directory checksums or rolling checksums as follows:

| | |
|---|---|
| A1 Node CS | 967ede40cfdbddff746969316416f75a |
| A1 TD Rolling CS | 8b00aeaa0d70f040159a329609d0ba65 = CS of: |
| | 7b31b32fec24b4cf908259dffa6d6ac4 |
| | 967ede40cfdbddff746969316416f75a |
| | a7e3fff9d32c29f8938f81b53194f18d |
| A1 BU Rolling CS | 967ede40cfdbddff746969316416f75a |
| B1 Node CS | a7e3fff9d32c29f8938f81b53194f18d |
| B1 TD Rolling CS | a7e3fff9d32c29f8938f81b53194f18d |
| B1 BU Rolling CS | b39598ad84b534746996c613b0afcf18 = CS of: |
| | 967ede40cfdbddff746969316416f75a |
| | a7e3fff9d32c29f8938f81b53194f18d |
| C1 Node CS | 08d389c6afe9a646bbcac6379614dd2f |
| C1 TD Rolling CS | 7b31b32fec24b4cf908259dffa6d6ac4 = CS of: |
| | 08d389c6afe9a646bbcac6379614dd2f |
| | fa30fe8f82549bf817911f7166d1ab18 |
| C1 BU Rolling CS | 86ab30fd48e084b80bcf287c69011935 = CS of: |
| | 08d389c6afe9a646bbcac6379614dd2f |
| | 967ede40cfdbddff746969316416f75a |
| D1 Node CS | fa30fe8f825491A17911f7166d1ab18 |
| D1 TD Rolling CS | fa30fe8f82549bf817911f7166d1ab18 |
| D1 BU Rolling CS | 49b8731d32aa4a0c52f36886595146b7 = CS of: |
| | 86ab30fd48e084b80bcf287c69011935 |
| | fa30fe8f82549bf817911f7166d1ab18 |

With reference back to FIG. 3G for native tree comparisons, the order of comparison is as follows: start with comparing the root rolling checksum: A1 top down rolling cs, which is different between the reference tree and the Test 1 tree, and thus it is now known that the trees have at least one delta. Next, compare the root directory checksums: A1 directory cs, which is different between the reference tree and the Test 1 tree, and thus it is now known that a delta exists within the A1 directory or node. Next select a branch to follow and alternate, for each directory, between comparing each directory's rolling checksum and the directory checksum. In this example the B1 branch is selected and the rolling checksum and directory checksum comparison are processed: B1 top down rolling cs and B1 directory cs, which are both different, and thus it is known that a delta exists within the B1 directory or node. Once a leaf node such as B1 is reached for a selected branch, select another branch to follow and alternate, for each directory, between comparing each directory's rolling checksum and the directory checksum. In this instance, C1 is selected next and the rolling checksum and directory checksum comparison are processed: C1 top down rolling cs, which is identical, and thus it is known that no deltas exist within the C1 branch and processing can end (no evaluation needed on directory or node D1 and no remaining branches).

For the reverse tree comparisons, the order of comparison may be as follows: start with comparing the root rolling checksum: A1 top down rolling cs, which is different between the reference tree and the Test 1 tree, and thus it is now known that the trees have at least one delta. Next, compare the root directory checksum: A1 directory cs, which is different between the reference tree and the Test 1 tree, and thus it is now known that a delta exists within the A1 directory or node. Next, the segments are sorted by length, and searched in order of longest to shortest. Start with comparing the leaf rolling checksum: D1 bottom up rolling cs, which is identical, then compare the leaf directory checksum: D1 directory cs, which is also identical, and thus it is now known there are no deltas at the D1 level. Continue to follow the segment alternating, for each directory, between comparing each directory's rolling checksum and the directory checksum: C1 bottom up rolling cs and C1 directory cs, which are identical, and thus it is now known there are no deltas at the C1 level. Once the end node of the segment such as C1 is reached for selected segment, select another segment based on length to follow and alternate, for each directory, between comparing each directory's rolling checksum and the directory checksum. In this instance, B1 is selected next and the rolling checksum and directory checksum comparison are processed: B1 bottom up rolling cs and B1 directory cs, which are both different, and thus it is known that a delta exists within the B1 directory or node. In this test case, the reverse tree's rolling cs were not as effective as a native tree comparison. Once the rolling cs on node C1 matched on the native tree, node D1 did not require evaluation as all deltas within the branch had been located, and thus the native tree comparison was more efficient.

Figure 3H:
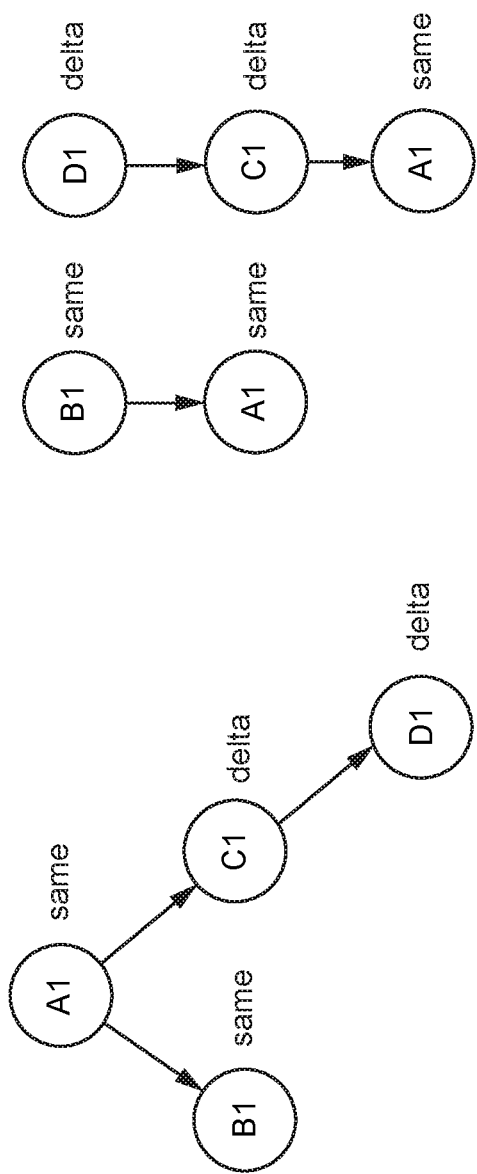

FIG. 3H shows an target tree—Test 2 tree to evaluate against the reference tree. For illustrative purposes the directories or nodes are marked as to whether they contain identical or different data. The directories or nodes are shown in both a native tree format and reverse tree segments. Test 2 files/data are then created or populated for each directory such that valid checksums for the reference files/data can be calculated. The source files/data may be created as follows:

```
echo "test2 a1" > test1/A/a1
echo "test2 b1" > test1/A/B/b1
echo "test2 c1" > test1/A/C/c1
echo "test1 d1" > test1/A/C/D/d1
```

The checksums for each Test 2 files/data are calculated by applying a hash function or algorithm to the source files/data. In this instance, the MD5 message-digest algorithm is applied to the to the source files/data producing a 128-bit hash value as follows:

| | |
|---|---|
| MD5 (A/a1) = | c79c33cd9789303c823cf5c74e45cafd |
| MD5 (A/C/c1) = | 79ea35dc29f14e9ffc5f1869b555a1d4 |
| MD5 (A/C/D/d1) = | 3e5b8b99becedd53146c4271835f720d |
| MD5 (A/B/b1) = | 91cf7e2ce804288734d624df4d8b80bc |

The rolling checksums for each directory level are calculated as a concatenation of prior directory checksums or rolling checksums as follows:

| | |
|---|---|
| A1 Node CS | c79c33cd9789303c823cf5c74e45cafd |
| A1 TD Rolling CS | fff39c591a3788dcf67e2845479611c7 = CS of: |
| | 91cf7e2ce804288734d624df4d8b80bc |
| | b4212987775b140ab1712d10d278c962 |
| | c79c33cd9789303c823cf5c74e45cafd |
| A1 BU Rolling CS | c79c33cd9789303c823cf5c74e45cafd |
| B1 Node CS | 91cf7e2ce804288734d624df4d8b80bc |

-continued

| | |
|---|---|
| B1 TD Rolling CS | 91cf7e2ce804288734d624df4d8b80bc |
| B1 BU Rolling CS | d9f95ae63571913168f5a3eed8dba6de = CS of:<br>91cf7e2ce804288734d624df4d8b80bc<br>c79c33cd9789303c823cf5c74e45cafd |
| C1 Node CS | 79ea35dc29f14e9ffc5f1869b555a1d4 |
| C1 TD Rolling CS | b4212987775b140ab1712d10d278c962 = CS of:<br>3e5b8b99becedd53146c4271835f720d<br>79ea35dc29f14e9ffc5f1869b555a1d4 |
| C1 BU Rolling CS | 813e7e885fcd52d0d3e8435955c9eda9 = CS of:<br>79ea35dc29f14e9ffc5f1869b555a1d4<br>c79c33cd9789303c823cf5c74e45cafd |
| D1 Node CS | 3e5b8b99becedd53146c4271835f720d |
| D1 TD Rolling CS | 3e5b8b99becedd53146c4271835f720d |
| D1 BU Rolling CS | d1cfca4a54e77448b388660868ae889d = CS of:<br>3e5b8b99becedd53146c4271835f720d<br>813e7e885fcd52d0d3e8435955c9eda9 |

With reference back to FIG. 3H for native tree comparisons, the order of comparison is as follows: start with comparing the root rolling checksum: A1 top down rolling cs, which is different between the reference tree and the Test 1 tree, and thus it is now known that the trees have at least one delta. Next, compare the root directory checksums: A1 directory cs, which is identical between the reference tree and the Test 1 tree, and thus it is now known that a delta does not exist within the A1 directory or node. Next select a branch to follow and alternate, for each directory, between comparing each directory's rolling checksum and the directory checksum. In this example the B1 branch is selected and the rolling checksum and directory checksum comparison are processed: B1 top down rolling cs and B1 directory cs, which are both identical, and thus it is known that a delta does not exist within the B1 directory or node. Once a leaf node such as B1 is reached for a selected branch, select another branch to follow and alternate, for each directory, between comparing each directory's rolling checksum and the directory checksum. In this instance, C1 is selected next and the rolling checksum and directory checksum comparison are processed: C1 top down rolling cs and C1 directory cs, which are both different, and thus it is known that a delta exists within the C1 directory or node. D1 is selected next and the rolling checksum and directory checksum comparison are processed: D1 top down rolling cs and D1 directory cs, which are both different, and thus it is known that a delta exists within the D1 directory or node.

For the reverse tree comparisons, the order of comparison may be as follows: start with comparing the root rolling checksum: A1 top down rolling cs, which is different between the reference tree and the Test 1 tree, and thus it is now known that the trees have at least one delta. Next, compare the root directory checksum: A1 directory cs, which is identical between the reference tree and the Test 1 tree, and thus it is now known that a delta does not exist within the A1 directory or node. Next, the segments are sorted by length, and searched in order of longest to shortest. Start with comparing the leaf rolling checksum: D1 bottom up rolling cs, which is different, then compare the leaf directory checksum: D1 directory cs, which is also different, and thus it is now known there a delta exists at the D1 level. Continue to follow the segment alternating, for each directory, between comparing each directory's rolling checksum and the directory checksum: C1 bottom up rolling cs and C1 directory cs, which are both different, and thus it is now known there a delta also exists at the C1 level. Once the end node of the segment such as C1 is reached for selected segment, select another segment based on length to follow and alternate, for each directory, between comparing each directory's rolling checksum and the directory checksum. In this instance, B1 is selected next and the rolling checksum and directory checksum comparison are processed: B1 bottom up rolling cs, which is identical, and thus it is known that a delta does not exist within the B1 directory or node and the remainder of the segment. In this test case, the reverse tree's rolling cs were more effective than a native tree comparison. Once the rolling cs on node B1 matched on the reverse tree, node A1 did not require evaluation as all deltas within the segment had been located, and thus the reverse tree comparison was more efficient.

Expansion to File Level Checksums

As described herein, the code comprehension tool is capable of processing native tree comparisons, reverse tree comparisons, or a combination of both native tree comparisons and reverse tree comparisons to efficiently identify deltas at tree and the directory level. The comparison are processed irrespective of the programming language used to write the data or code within the directories, and thus the change analysis is applicable across a poly-lingual corpus of data or code. However, once the deltas are identified at the directory level, a more fine grained review of the underlying data may be performed to identify the exact location of the delta within the files of the directory. This process can be difficult and require code analyzers configured for different programming languages, or a manual review line by line of the data or code within the files. In order to overcome this problem and others, the change analysis described herein for the tree and directory level may be expanded to the file level irrespective of the programming language by calculating checksums in a similar manner for each file within the directory levels.

In one illustrative example, a reference tree may be obtained (e.g., the past code with known checksums already calculated for tree, directory, and file levels) and an target tree may be obtained (e.g., a tree submitted by a service that may have potential changes to the code and does not have checksums previously calculated). The code comprehension tool calculates checksums for the target tree (a rolling checksum for the entire tree or branches, a relative checksum for the directory level, and a folder level checksum for the folder level) and compares the checksums between the target tree and the reference tree to find similarities and differences in the code, where a difference is indicative of a change or delta in the code. In some instances, the checksum is calculated by applying a hash function or algorithm (e.g., SHA256 cryptographic hash) to the underlying code or data (e.g., the hash function or algorithm may be applied to the binary value of underlying data). The code comprehension tool calculates the checksums for the reference tree using the hash function or algorithm, calculates the checksums for the target tree using the same hash function or algorithm, and compares results across the reference and target trees. Any difference between checksums is determinative of a delta in the underlying code or data.

Figure 4:
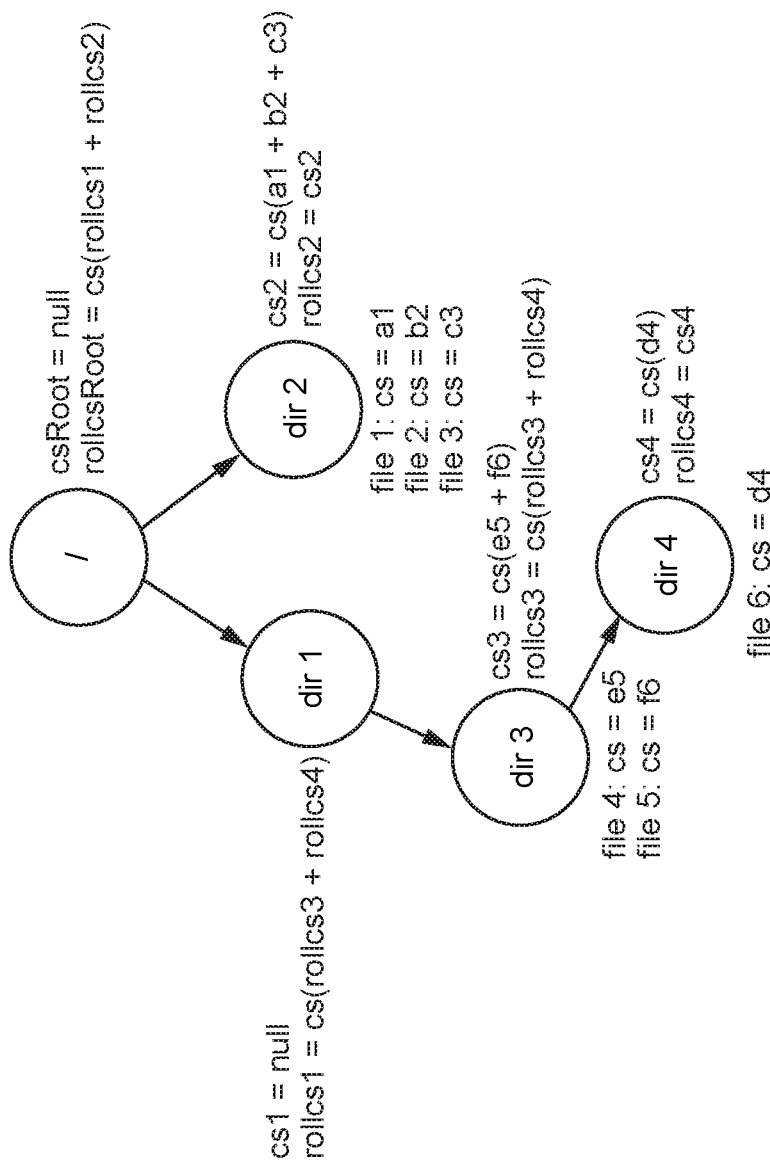
FIG. 4 depicts a data structure illustrating techniques to determine deltas of a target data structure against a source data structure in accordance with various embodiments.

With reference to FIG. 4, the code comprehension tool calculates a file level checksum d4 for file 6 of directory 4, since this is the only file for the directory then the directory level checksum cs4 is also=d4, and since this is the first directory or leaf of the branch then the rolling checksum rollcs4 is also=d4 or cs4, then the code comprehension tool calculates a file level checksum e5 and f6 for files 4 and 5 of directory 3, the directory level checksum cs3 is a concatenation of e5 and f6, and the rolling checksum rollcs3 is a concatenation of the rolling checksum from directory 4 (rollcs4) and the rolling checksum from directory 3 (rollcs3), the directory level checksum and rolling checksum for the directory levels are saved, and the technique continues until each directory and file level is calculated and the root level is reached from each branch/leaf. The search/comparison between the reference tree and target tree can start with the rolling checksum for the root (rollcsroot), which in this instance is a concatenation between the rolling checksum (rollcs1 of the first branch) and the (rollcs2 of the second branch), and if the rollcsroot is the same between the reference tree and update tree then no further action is need as the code in the trees is the same. However, if they are different, then the process compares rolling checksums saved at each directory level till a branch or segment is found with different rolling checksums (e.g., rollcs1 and rollcs2), and if the rolling checksums for one or more of the branches are different then the code comprehension tool also checks directory level checksums (e.g., cs1 and cs2) at each directory level and when there is a difference in directory level, the code comprehension tool checks file level checksums (e.g., a1, b1, c1) until it finds files that have changes. Once the file level changes are discovered, individual line code comparisons can be performed to identify the exact change that has occurred between the reference tree and the target tree.

Techniques for Change Analysis in Poly Lingual Corpus of Hierarchies

Figure 5:
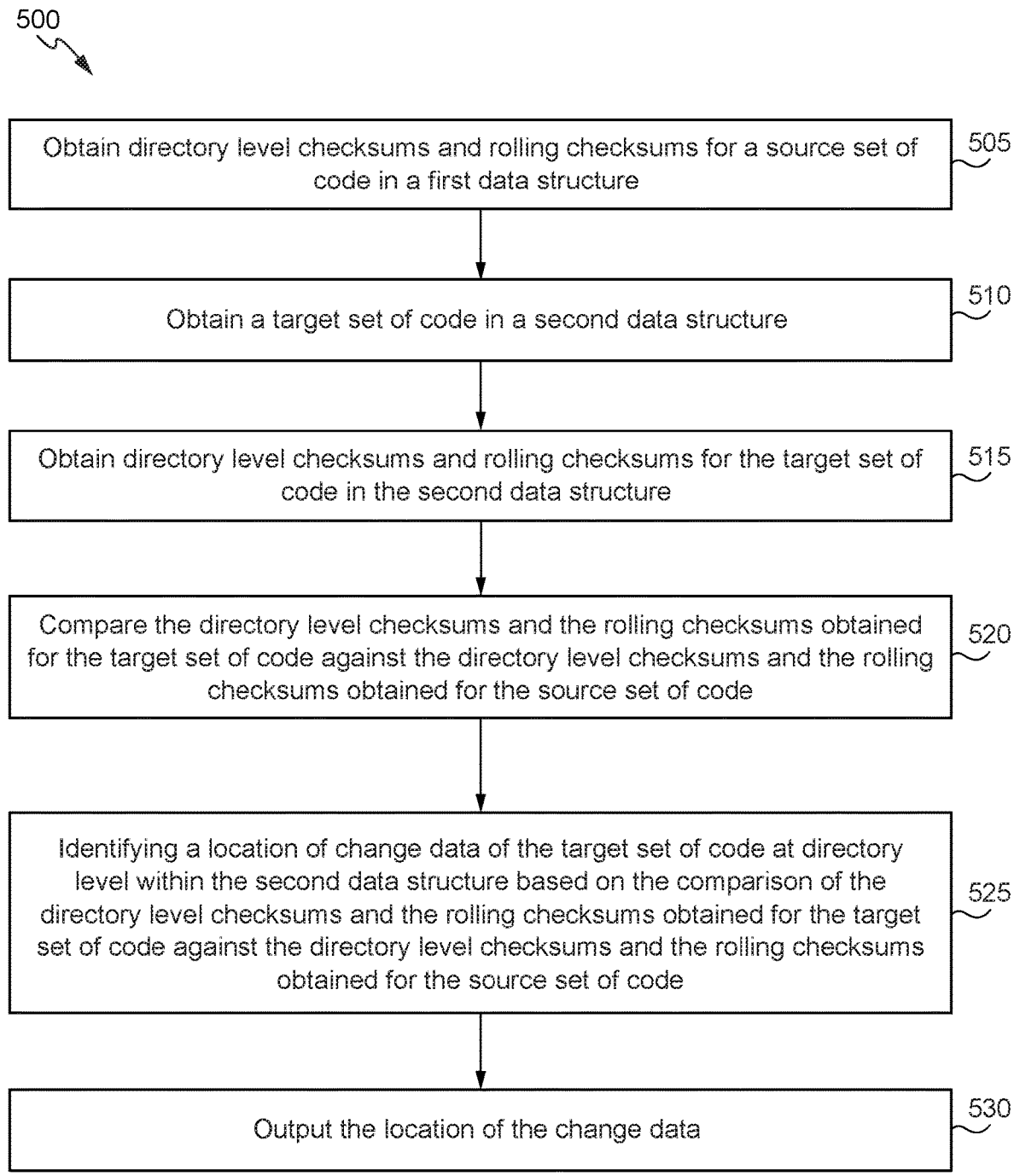
FIG. 5 depicts a flowchart illustrating a process for determining deltas of a target data structure against a source data structure in accordance with various embodiments.

FIG. 5 illustrates processes and operations for determining deltas of a target data structure (e.g., a corpus hierarchy such as a tree) against a source data structure (e.g., a source tree). Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted in FIG. 5 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 5 is not intended to be limiting. Other sequences of steps may also be performed according to alternative embodiments. For example, in alternative embodiments the steps outlined above may be performed in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5 shows a flowchart 500 that illustrates a process for determining deltas of a target data structure against a source data structure. In some embodiments, the processes depicted in flowchart 500 may be implemented by the architecture, systems, and techniques depicted in FIGS. 1, 2A, 2B, 3A-3H, and 4. For example, the processes may be implemented in a code comprehension tool to make it easier to understand and explore existing code bases by providing cross-references. The code comprehension tool scans an arbitrary poly-lingual code base for vulnerabilities (language detection even in the presence of evasive efforts, including comprehending multiple language use within a single source file) using various tree, directory, and file level checksums.

At step 505, directory level checksums and rolling checksums are obtained for a source set of code in a first data structure using a data processing system (e.g., the code scanning tool 130 described with respect to FIG. 1). The first data structure may be a hierarchical data structure such as a tree. In some instances, the hierarchical data structure is in its native format (root to leaf). In other instances, the hierarchical data structure is in its reverse format (leaf to root). Optionally, file level checksums are also obtained for the source set of code in the first data structure using the data processing system. In some instances, the source set of code is the past code with known checksums already calculated for tree, directory, and/or file levels, and thus may be retrieved from a data storage structure (e.g., code repository 110 described with respect to FIG. 1). In other instances, the source set of code is the past code and the checksums may need to be calculated for tree, directory, and/or file levels. The obtaining may comprise: (i) creating directories for the first data structure; (ii) creating source files for the source set of code; (iii) populating the directories with the source files; (iv) optionally calculating the file level checksums for the source set of code; (v) calculating the directory level checksums for the source set of code (optionally based on the file level checksums); and (vi) calculating the rolling checksums for the source set of code based on the directory level checksums for the source set of code. The directory level checksums and the rolling checksums (and optional file level checksums) are calculated for each directory level node of the first data structure. Rolling checksums are calculated for each directory level node of the first data structure as a concatenation of the directory level checksum for the directory level node and the directory level checksums for all descendent directory level nodes of the directory level node. Upon calculating the directory level checksums and the rolling checksums (and optional file level checksums) for each directory level node, the directory level checksums and the rolling checksums (and optional file level checksums) are stored and maintained for downstream processing.

At step 510, a target set of code in a second data structure is obtained. The second data structure may be a hierarchical data structure such as a tree. In some instances, the hierarchical data structure is in its native format (root to leaf). In other instances, the hierarchical data structure is in its reverse format (leaf to root). In some instances, the target set of code may be submitted by a service that may have potential changes to the code and does not have checksums previously calculated for tree, directory, and/or file levels.

At step 515, directory level checksums and rolling checksums are obtained for the target set of code in the second data structure using a data processing system (e.g., the code scanning tool 130 described with respect to FIG. 1). Optionally, file level checksums are also obtained for the target set of code in the second data structure using the data processing system. The obtaining may comprise: (i) creating directories for the second data structure; (ii) creating target files for the target set of code; (iii) populating the directories with the target files; (iv) optionally calculating the file level checksums for the target set of code; (v) calculating the directory level checksums for the target set of code (optionally based on the file level checksums); and (vi) calculating the rolling checksums for the target set of code based on the directory level checksums for the target set of code. The directory level checksums and the rolling checksums (and optional file level checksums) are calculated for each directory level node of the first data structure. Rolling checksums are calculated for each directory level node of the second data structure as a concatenation of the directory level checksum for the directory level node and the directory level checksums for all descendent directory level nodes of the directory level node. Upon calculating the directory level checksums and the rolling checksums (and optional file level checksums) for each directory level node, the directory level checksums and the rolling checksums (and optional file level checksums) are stored and maintained for downstream processing.

At step 520, the directory level checksums and the rolling checksums obtained for the target set of code are compared against the directory level checksums and the rolling checksums obtained for the source set of code. In instances in which file level checksums are calculated, the comparing comprises comparing the file level checksums, the directory level checksums, and the rolling checksums obtained for the target set of code against the file level checksums, the directory level checksums, and the rolling checksums obtained for the source set of code. In instances in which the hierarchical data structure is in the native format, the comparing comprises a top down approach starting at root level comparison and working down each branch for the file level checksum, directory level checksum, and the rolling checksum comparisons. In instances in which the hierarchical data structure is in the reverse format, the comparing comprises a bottom up approach starting at leaf level comparison and working up each segment for the file level checksum, directory level checksum, and the rolling checksum comparisons.

At step 525, a location of change data of the target set of code is identified at directory level within the second data structure based on the comparison of the directory level checksums and the rolling checksums obtained for the target set of code against the directory level checksums and the rolling checksums obtained for the source set of code. In instances in which file level checksums are calculated and compared, the identifying comprises identifying the location of the change data of the target set of code at the directory level and file level within the second data structure based on the comparison of the file level checksums, the directory level checksums, and the rolling checksums obtained for the target set of code against the file level checksums, the directory level checksums, and the rolling checksums obtained for the source set of code.

At step 530, the location of the change data is output. For example, the location of the change data is displayed on a display (e.g., within a user interface), transmitted to an end user, recorded in a memory storage device, or the like.

Illustrative Systems

Figure 6:
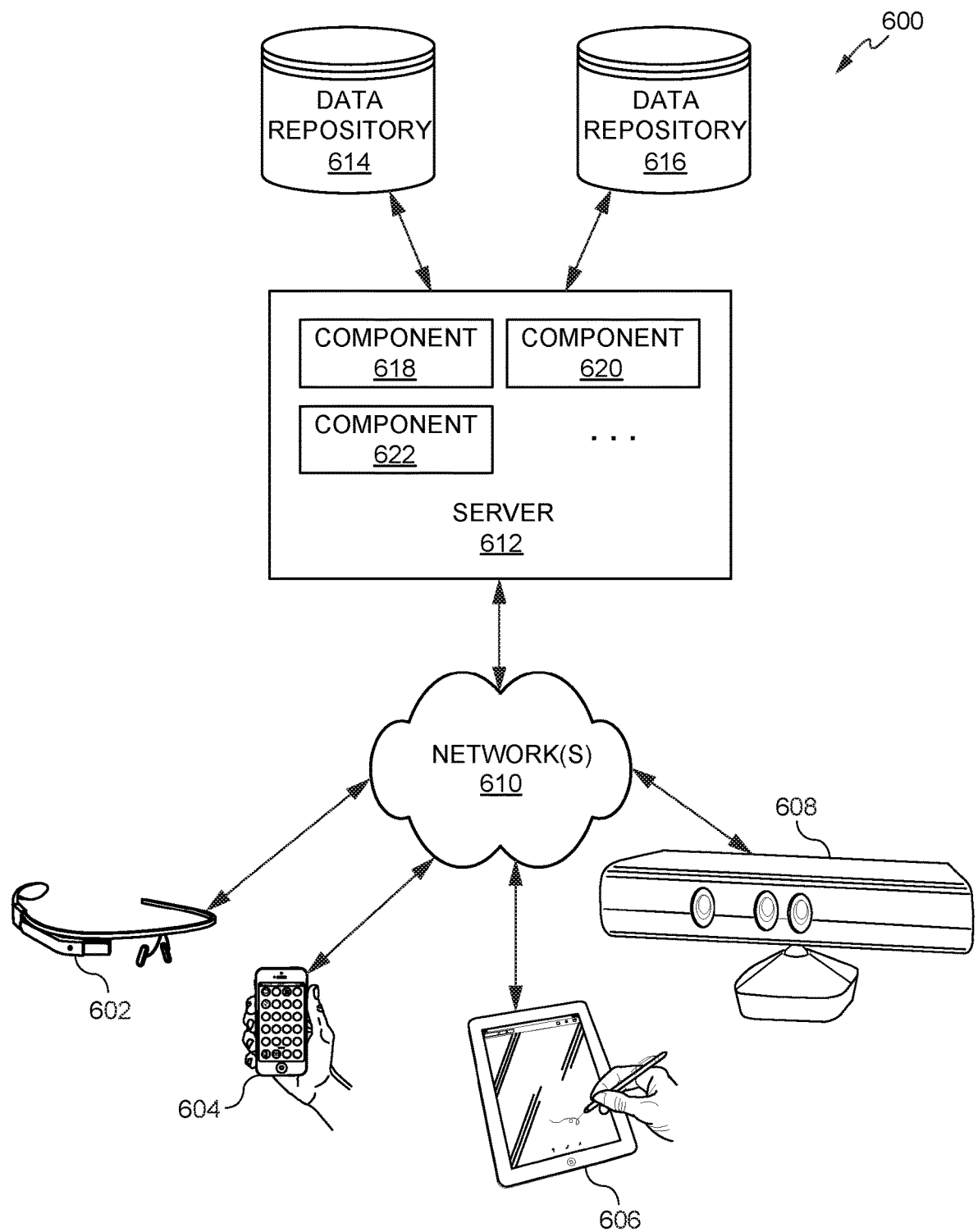
FIG. 6 depicts a simplified diagram of a distributed system for implementing various embodiments.

FIG. 6 depicts a simplified diagram of a distributed system 600 for implementing an embodiment. In the illustrated embodiment, distributed system 600 includes one or more client computing devices 602, 604, 606, and 608, coupled to a server 612 via one or more communication networks 610. Clients computing devices 602, 604, 606, and 608 may be configured to execute one or more applications.

In various embodiments, server 612 may be adapted to run one or more services or software applications that enable a user to determine deltas of a target data structure against a source data structure.

In certain embodiments, server 612 may also provide other services or software applications that can include non-virtual and virtual environments. In some embodiments, these services may be offered as web-based or cloud services, such as under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in FIG. 6, server 612 may include one or more components 618, 620 and 622 that implement the functions performed by server 612. These components may include software components that may be executed by one or more processors, hardware components, or combinations thereof. It should be appreciated that various different system configurations are possible, which may be different from distributed system 600. The embodiment shown in FIG. 6 is thus one example of a distributed system for implementing an embodiment system and is not intended to be limiting.

Users may use client computing devices 602, 604, 606, and/or 608 to determine deltas of a target data structure against a source data structure. A client device may provide an interface that enables a user of the client device to interact with the client device. The client device may also output information to the user via this interface. Although FIG. 6 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 610 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 610 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 612 can include one or more virtual machines running virtual operating systems, or other computing architectures involving virtualization such as one or more flexible pools of logical storage devices that can be virtualized to maintain virtual storage devices for the server. In various embodiments, server 612 may be adapted to run one or more services or software applications that provide the functionality described in the foregoing disclosure.

The computing systems in server 612 may run one or more operating systems including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more data repositories 614, 616. These data repositories may be used to store data and other information in certain embodiments. For example, one or more of the data repositories 614, 616 may be used to store information for determining deltas of a target data structure against a source data structure. Data repositories 614, 616 may reside in a variety of locations. For example, a data repository used by server 612 may be local to server 612 or may be remote from server 612 and in communication with server 612 via a network-based or dedicated connection. Data repositories 614, 616 may be of different types. In certain embodiments, a data repository used by server 612 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 614, 616 may also be used by applications to store application data. The data repositories used by applications may be of different types such as, for example, a key-value store repository, an object store repository, or a general storage repository supported by a file system.

Figure 7:
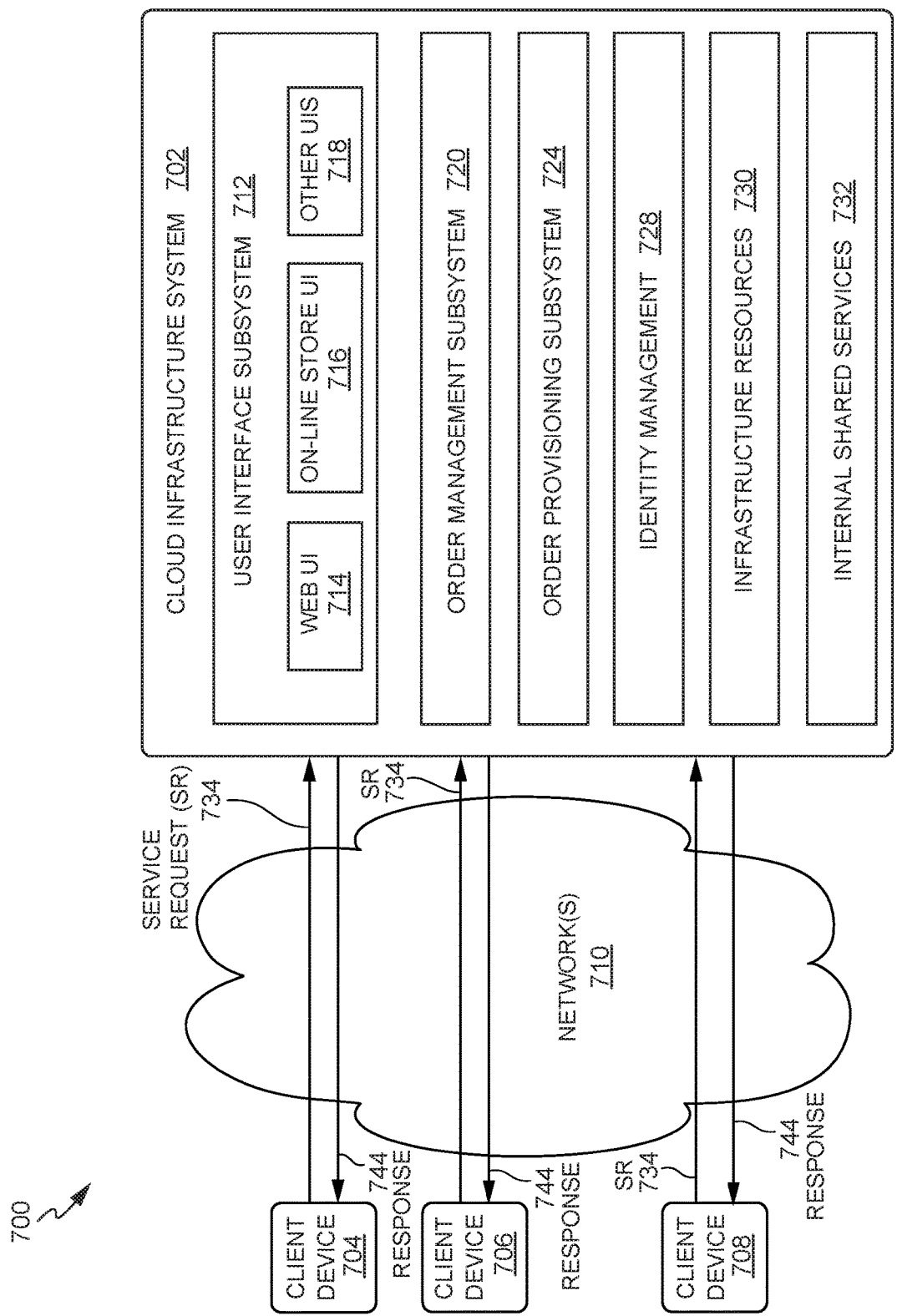
FIG. 7 depicts a simplified block diagram of one or more components of a system environment by which services provided by one or more components of an embodiment system may be offered as cloud services, in accordance with various embodiments.

In certain embodiments, the determine deltas of a target data structure against a source data structure described in this disclosure may be offered as services via a cloud environment. FIG. 7 is a simplified block diagram of a cloud-based system environment in which the determination of deltas of a target data structure against a source data structure may be offered as cloud services, in accordance with certain embodiments. In the embodiment depicted in FIG. 7, cloud infrastructure system 702 may provide one or more cloud services that may be requested by users using one or more client computing devices 704, 706, and 708. Cloud infrastructure system 702 may comprise one or more computers and/or servers that may include those described above for server 612. The computers in cloud infrastructure system 702 may be organized as general purpose computers, specialized server computers, server farms, server clusters, or any other appropriate arrangement and/or combination.

Network(s) 710 may facilitate communication and exchange of data between clients 704, 706, and 708 and cloud infrastructure system 702. Network(s) 710 may include one or more networks. The networks may be of the same or different types. Network(s) 710 may support one or more communication protocols, including wired and/or wireless protocols, for facilitating the communications.

The embodiment depicted in FIG. 7 is only one example of a cloud infrastructure system and is not intended to be limiting. It should be appreciated that, in some other embodiments, cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in alternative embodiments.

The term cloud service is generally used to refer to a service that is made available to users on demand and via a communication network such as the Internet by systems (e.g., cloud infrastructure system 702) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 702 may provide one or more cloud services using different models such as under a Software as a Service (SaaS) model, a Platform as a Service (PaaS) model, an Infrastructure as a Service (IaaS) model, and others, including hybrid service models. Cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 702. Cloud infrastructure system 702 then performs processing to provide the services requested in the customer's subscription order. For example, determine deltas of a target data structure against a source data structure. Cloud infrastructure system 702 may be configured to provide one or even multiple cloud services.

Cloud infrastructure system 702 may provide the cloud services via different deployment models. In a public cloud model, cloud infrastructure system 702 may be owned by a third party cloud services provider and the cloud services are offered to any general public customer, where the customer can be an individual or an enterprise. In certain other embodiments, under a private cloud model, cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

Client computing devices 704, 706, and 708 may be of different types (such as devices 602, 604, 606, and 608 depicted in FIG. 6) and may be capable of operating one or more client applications. A user may use a client device to interact with cloud infrastructure system 702, such as to request a service provided by cloud infrastructure system 702. For example, a user may use a client device to the request code scanning to determine deltas of a target data structure against a source data structure.

In some embodiments, the processing performed by cloud infrastructure system 702 for determining deltas of a target data structure against a source data structure. This analysis may involve using, analyzing, and manipulating large datasets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 702 for determining deltas of a target data structure against a source data structure. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are utilized for facilitating the provision of various cloud services offered by cloud infrastructure system 702. Infrastructure resources 730 may include, for example, processing resources, storage or memory resources, networking resources, and the like.

In certain embodiments, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 702 may itself internally use services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 702 may comprise multiple subsystems. These subsystems may be implemented in software, or hardware, or combinations thereof. As depicted in FIG. 7, the subsystems may include a user interface subsystem 712 that enables users or customers of cloud infrastructure system 702 to interact with cloud infrastructure system 702. User interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, and 718. For example, a customer may access the online store, browse cloud services offered by cloud infrastructure system 702, and place a subscription order for one or more services offered by cloud infrastructure system 702 that the customer wishes to subscribe to.

The service request may include information identifying the customer and one or more services that the customer desires to subscribe to. For example, a customer may place a subscription order for a property painting related service offered by cloud infrastructure system 702. As part of the order, the customer may provide information identifying a set of code to be scanned.

In certain embodiments, such as the embodiment depicted in FIG. 7, cloud infrastructure system 702 may comprise an order management subsystem (OMS) 720 that is configured to process the new order. As part of this processing, OMS 720 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OP S 724 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 702 may send a response or notification 744 to the requesting customer to indicate when the requested service is now ready for use. In some instances, information (e.g., a link) may be sent to the customer that enables the customer to start using and availing the benefits of the requested services. In certain embodiments, for a customer requesting code scanning, the response may include a display of the deltas of a target data structure.

Cloud infrastructure system 702 may provide services to multiple customers. For each customer, cloud infrastructure system 702 is responsible for managing information related to one or more subscription orders received from the customer, maintaining customer data related to the orders, and providing the requested services to the customer. Cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 702 may provide services to multiple customers in parallel. Cloud infrastructure system 702 may store information for these customers, including possibly proprietary information. In certain embodiments, cloud infrastructure system 702 comprises an identity management subsystem (IMS) 728 that is configured to manage customers information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
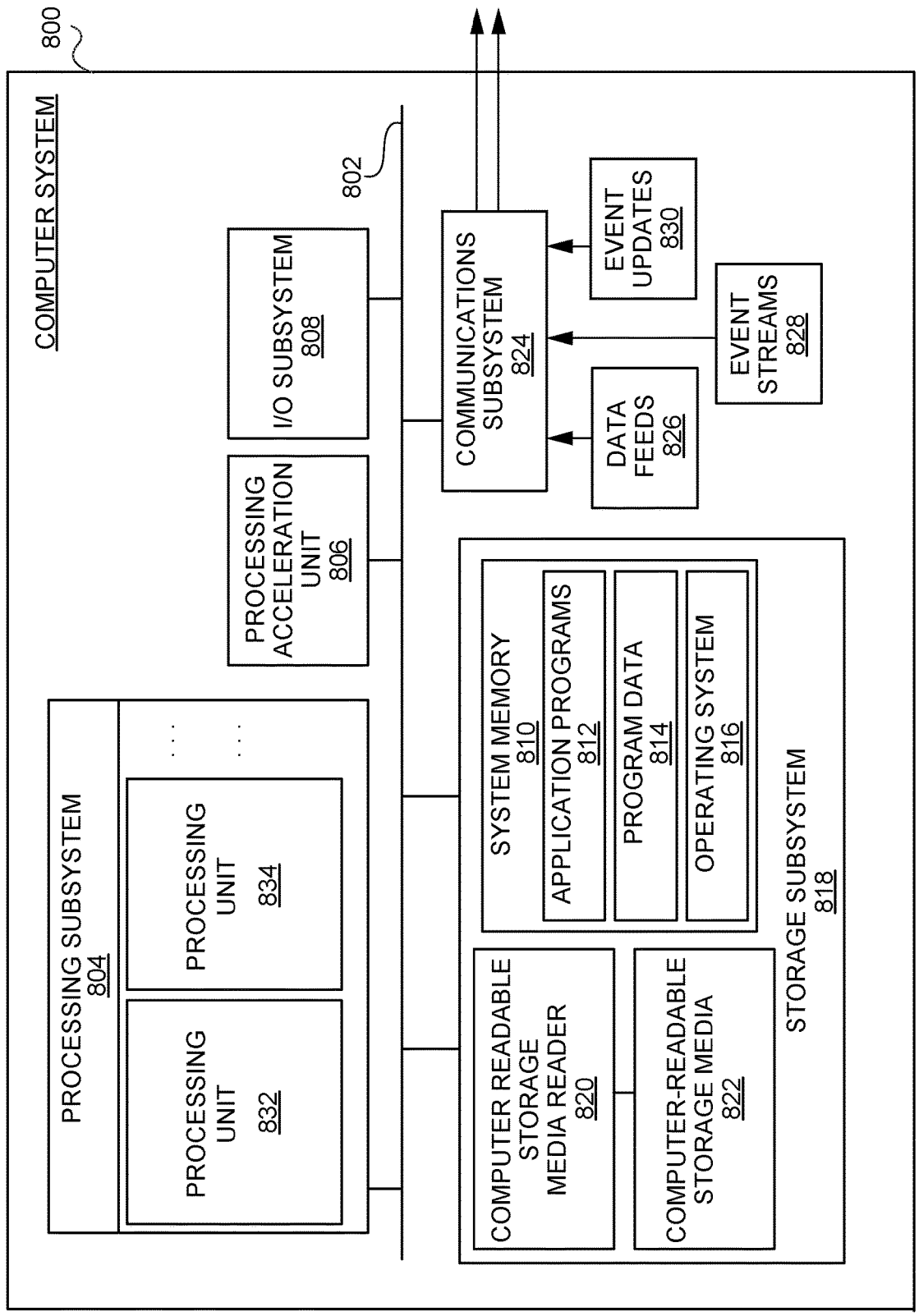
FIG. 8 depicts an example computer system that may be used to implement various embodiments.

FIG. 8 illustrates an exemplary computer system 800 that may be used to implement certain embodiments. For example, in some embodiments, computer system 800 may be used to implement the code scanning tool and various servers and computer systems described above. As shown in FIG. 8, computer system 800 includes various subsystems including a processing subsystem 804 that communicates with a number of other subsystems via a bus subsystem 802. These other subsystems may include a processing acceleration unit 806, an I/O subsystem 808, a storage subsystem 818, and a communications subsystem 824. Storage subsystem 818 may include non-transitory computer-readable storage media including storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processors, application specific integrated circuits (ASICs), or field programmable gate arrays (FPGAs). The processors may include be single core or multicore processors. The processing resources of computer system 800 can be organized into one or more processing units 832, 834, etc. A processing unit may include one or more processors, one or more cores from the same or different processors, a combination of cores and processors, or other combinations of cores and processors. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 822 including potentially on one or more storage devices. Through suitable programming, processing subsystem 804 can provide various functionalities described above. In instances where computer system 800 is executing one or more virtual machines, one or more processing units may be allocated to each virtual machine.

In certain embodiments, a processing acceleration unit 806 may optionally be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term input device is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Ski® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information and data that is used by computer system 800. Storage subsystem 818 provides a tangible non-transitory computer-readable storage medium for storing the basic programming and data constructs that provide the functionality of some embodiments. Storage subsystem 818 may store software (e.g., programs, code modules, instructions) that when executed by processing subsystem 804 provides the functionality described above. The software may be executed by one or more processing units of processing subsystem 804. Storage subsystem 818 may also provide a repository for storing data used in accordance with the teachings of this disclosure.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM), dynamic random access memory (DRAM), and the like.

By way of example, and not limitation, as depicted in FIG. 8, system memory 810 may load application programs 812 that are being executed, which may include various applications such as Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 822 may store programming and data constructs that provide the functionality of some embodiments. Computer-readable media 822 may provide storage of computer-readable instructions, data structures, program modules, and other data for computer system 800. Software (programs, code modules, instructions) that, when executed by processing subsystem 804 provides the functionality described above, may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 818 may also include a computer-readable storage media reader 820 that can further be connected to computer-readable storage media 822. Reader 820 may receive and be configured to read data from a memory device such as a disk, a flash drive, etc.

In certain embodiments, computer system 800 may support virtualization technologies, including but not limited to virtualization of processing and memory resources. For example, computer system 800 may provide support for executing one or more virtual machines. In certain embodiments, computer system 800 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 800. Accordingly, multiple operating systems may potentially be run concurrently by computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the communication subsystem may be used to obtain a set of code for scanning.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, in addition to other forms, communications subsystem 824 may receive input communications in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to communicate data from computer system 800 to other computer systems or networks. The data may be communicated in various different forms such as structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   obtaining, by a data processing system, directory level checksums and rolling checksums for a source set of code in a first data structure that is a hierarchical data structure;
   obtaining, by the data processing system, a target set of code in a second data structure that is a hierarchical data structure;
   calculating, by the data processing system, directory level checksums for the target set of code, wherein the directory level checksums are calculated for each directory level node of the second data structure;
   calculating, by the data processing system, rolling checksums for the target set of code based on the directory level checksums for the target set of code;
   comparing, by the data processing system, the directory level checksums and the rolling checksums calculated for the target set of code against the directory level checksums and the rolling checksums calculated for the source set of code;
   identifying, by the data processing system, a location of change data of the target set of code at directory level within the second data structure based on the comparison of the directory level checksums and the rolling checksums calculated for the target set of code against the directory level checksums and the rolling checksums obtained for the source set of code; and
   outputting, by the data processing system, the location of the change data;
   wherein upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

2. The method of claim 1, wherein the obtaining the directory level checksums and rolling checksums for the source set of code, comprises:
   creating directories for the first data structure;
   creating source files for the source set of code;
   populating the directories with the source files;
   calculating the directory level checksums for the source set of code; and
   calculating the rolling checksums for the source set of code based on the directory level checksums for the source set of code.

3. The method of claim 1, further comprising:
   creating, by the data processing system, directories for the second data structure;
   creating, by the data processing system, target files for the target set of code; and
   populating, by the data processing system, the directories with the target files.

4. The method of claim 1, wherein the hierarchical data structure is in native format, and the comparing comprises a top down approach starting at root level comparison and working down each branch for the directory level checksum and the rolling checksum comparisons.

5. The method of claim 1, wherein the hierarchical data structure is in reverse format, and the comparing comprises a bottom up approach starting at root level comparison and working up each segment for the directory level checksum and the rolling checksum comparisons.

6. The method of claim 1, further comprising obtaining, by the data processing system, file level checksums for the source set of code in the first data structure, and calculating, by the data processing system, file level checksums for the target set of code, wherein:
   the comparing comprises comparing the file level checksums, the directory level checksums, and the rolling checksums calculated for the target set of code against the file level checksums, the directory level checksums, and the rolling checksums calculated for the source set of code;
   the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and
   outputting, by the data processing system, the location of the change data.

7. A non-transitory computer-readable memory storing a plurality of instructions executable by one or more processors, the plurality of instructions comprising instructions that when executed by the one or more processors cause the one or more processors to perform processing comprising:
   obtaining directory level checksums and rolling checksums for a source set of code in a first data structure that is a hierarchical data structure;
   obtaining a target set of code in a second data structure that is a hierarchical data structure;
   calculating directory level checksums for the target set of code, wherein the directory level checksums are calculated for each directory level node of the second data structure;

calculating rolling checksums for the target set of code based on the directory level checksums for the target set of code;

comparing the directory level checksums and the rolling checksums calculated for the target set of code against the directory level checksums and the rolling checksums calculated for the source set of code;

identifying a location of change data of the target set of code at directory level within the second data structure based on the comparison of the directory level checksums and the rolling checksums calculated for the target set of code against the directory level checksums and the rolling checksums obtained for the source set of code; and outputting the location of the change data, wherein upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

8. The non-transitory computer-readable memory of claim 7, wherein the obtaining the directory level checksums and rolling checksums for the source set of code, comprises:
creating directories for the first data structure;
creating source files for the source set of code;
populating the directories with the source files;
calculating the directory level checksums for the source set of code; and
calculating the rolling checksums for the source set of code based on the directory level checksums for the source set of code.

9. The non-transitory computer-readable memory of claim 7, wherein the processing further comprises:
creating directories for the second data structure;
creating target files for the target set of code; and
populating the directories with the target files.

10. The non-transitory computer-readable memory of claim 7, wherein the hierarchical data structure is in native format, and the comparing comprises a top down approach starting at root level comparison and working down each branch for the directory level checksum and the rolling checksum comparisons.

11. The non-transitory computer-readable memory of claim 7, wherein the hierarchical data structure is in reverse format, and the comparing comprises a bottom up approach starting at root level comparison and working up each segment for the directory level checksum and the rolling checksum comparisons.

12. The non-transitory computer-readable memory of claim 7, wherein the processing further comprises:
the comparing comprises comparing the file level checksums, the directory level checksums, and the rolling checksums calculated for the target set of code against the file level checksums, the directory level checksums, and the rolling checksums calculated for the source set of code;
the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and
outputting the location of the change data.

13. A system comprising:
one or more processors; and
a memory coupled to the one or more processors, the memory storing a plurality of instructions executable by the one or more processors, the plurality of instructions comprising instructions that when executed by the one or more processors cause the one or more processors to perform processing comprising:
obtaining directory level checksums and rolling checksums for a source set of code in a first data structure that is a hierarchical data structure;
obtaining a target set of code in a second data structure that is a hierarchical data structure;
calculating directory level checksums for the target set of code, wherein the directory level checksums are calculated for each directory level node of the second data structure;
calculating rolling checksums for the target set of code based on the directory level checksums for the target set of code;
comparing the directory level checksums and the rolling checksums calculated for the target set of code against the directory level checksums and the rolling checksums obtained for the source set of code;
identifying a location of change data of the target set of code at directory level within the second data structure based on the comparison of the directory level checksums and the rolling checksums calculated for the target set of code against the directory level checksums and the rolling checksums calculated for the source set of code; and
outputting the location of the change data,
wherein upon calculating the directory level checksums for each directory level node, the directory level checksums are stored and maintained for downstream processing including the comparison of the directory level checksums and the rolling checksums calculated for the target set of code against the directory level checksums and the rolling checksums calculated for the source set of code; and rolling checksums are calculated for each directory level node of the second data structure as a concatenation of the directory level checksum for the directory level node and the directory level checksums for all descendent directory level nodes of the directory level node.

14. The system of claim 13, wherein the obtaining the directory level checksums and rolling checksums for the source set of code, comprises:
creating directories for the first data structure;
creating source files for the source set of code;
populating the directories with the source files;
calculating the directory level checksums for the source set of code; and
calculating the rolling checksums for the source set of code based on the directory level checksums for the source set of code.

15. The system of claim 13, wherein the hierarchical data structure is in native format, and the comparing comprises a top down approach starting at root level comparison and working down each branch for the directory level checksum and the rolling checksum comparisons.

16. The system of claim 13, wherein the hierarchical data structure is in reverse format, and the comparing comprises a bottom up approach starting at root level comparison and working up each segment for the directory level checksum and the rolling checksum comparisons.

17. The system of claim 13, wherein the processing further comprises:
- the comparing comprises comparing the file level checksums, the directory level checksums, and the rolling checksums calculated for the target set of code against the file level checksums, the directory level checksums, and the rolling checksums calculated for the source set of code;
- the identifying comprises identifying the location of the change data of the target set of code at the directory level and file level within the second data structure based on the comparison of the file level checksums, the directory level checksums, and the rolling checksums calculated for the target set of code against the file level checksums, the directory level checksums, and the rolling checksums calculated for the source set of code; and
- outputting the location of the change data.

* * * * *

UNITED STATES PATENT AND TRADEMARK OFFICE
CERTIFICATE OF CORRECTION

PATENT NO. : 11,307,850 B2
APPLICATION NO. : 17/028670
DATED : April 19, 2022
INVENTOR(S) : Murray It is certified that error appears in the above-identified patent and that said Letters Patent is hereby corrected as shown below:

On the Title Page

Item (56), Column 2, under Other Publications, Line 4, delete "https://dl.acm.Org/" and insert -- https://dl.acm.org/ --, therefor.

On page 2, item (56), Column 2, under Other Publications, Line 2, delete "at" and insert -- at: --, therefor.

In the Specification

In Column 9, Line 34, delete "and or" and insert -- and/or --, therefor.

In Column 13, Line 57, delete "tress" and insert -- trees --, therefor.

In Column 14, Line 10, delete "to the to the" and insert -- to the --, therefor.

In Column 14, Line 66, delete "to the to the" and insert -- to the --, therefor.

In Column 16, Line 47, delete "to the to the" and insert -- to the --, therefor.

In the Claims

In Column 33, Line 57, in Claim 1, delete "data;" and insert -- data, --, therefor.

Signed and Sealed this
Thirtieth Day of August, 2022

Katherine Kelly Vidal
*Director of the United States Patent and Trademark Office*